United States Patent
Atkinson et al.

(10) Patent No.: US 10,600,019 B1
(45) Date of Patent: Mar. 24, 2020

(54) SYSTEMS AND METHODS FOR MAIL PIECE INTERCEPTION, RESCUE TRACKING, AND CONFISCATION ALERTS AND RELATED SERVICES

(71) Applicant: Stamps.com Inc., El Segundo, CA (US)

(72) Inventors: Charles John Atkinson, Los Angeles, CA (US); Michael John Biswas, Los Angeles, CA (US); John Roland Clem, Redondo Beach, CA (US)

(73) Assignee: STAMPS.COM INC., El Segundo, CA (US)

( * ) Notice: Subject to any disclaimer, the term of this patent is extended or adjusted under 35 U.S.C. 154(b) by 0 days.

(21) Appl. No.: 16/236,338

(22) Filed: Dec. 28, 2018

Related U.S. Application Data

(63) Continuation of application No. 13/828,800, filed on Mar. 14, 2013, now Pat. No. 10,181,110, which is a
(Continued)

(51) Int. Cl.
*G06Q 10/08* (2012.01)
*G06F 17/24* (2006.01)

(52) U.S. Cl.
CPC ....... *G06Q 10/0833* (2013.01); *G06F 17/243* (2013.01)

(58) Field of Classification Search
CPC .......................... G06Q 10/0833; G06F 17/243
See application file for complete search history.

(56) References Cited

U.S. PATENT DOCUMENTS 5,043,908 A * 8/1991 Manduley ................. B07C 3/00
198/349.6
5,072,400 A * 12/1991 Manduley ................. B07C 1/00
700/226
(Continued)

OTHER PUBLICATIONS

"Request Delivery Intercept" published by www.ups.com on Oct. 22, 2011 (Year: 2011).*
(Continued)

*Primary Examiner* — Kevin H Flynn
*Assistant Examiner* — Omar Zeroual
(74) *Attorney, Agent, or Firm* — Pillsbury Winthrop Shaw Pittman LLP

(57) ABSTRACT

Exemplary embodiments of the present invention would project a route and a delivery schedule for relevant mail pieces and would monitor carrier recorded tracking events for those mail pieces to determine whether or not actual tracking events are following the projected route and the projected schedule, and/or whether or not issues that might impact their delivery and/or their delivery schedule, may have arisen along their projected route; such exemplary embodiments would provide an alert to the relevant user(s) and/or other authorized parties and/or relevant carrier(s) and would facilitate user interaction by the relevant user(s) and/or parties to provide intercept and/or rescue and/or confiscation instructions; exemplary embodiments would facilitate automatic interfaces with the relevant carriers and delivery services for the subject mail piece to resolve rescue, item loss, insurance coverage, postage refund, intervention and/or confiscation instructions and issues.

20 Claims, 10 Drawing Sheets

Related U.S. Application Data continuation-in-part of application No. 13/705,935, filed on Dec. 5, 2012, now abandoned.

(56) References Cited

U.S. PATENT DOCUMENTS

| | | | | |
|---|---|---|---|---|
| 5,122,959 | A * | 6/1992 | Nathanson | G08G 1/202 340/993 |
| 5,414,809 | A * | 5/1995 | Hogan | G06F 3/0481 715/765 |
| 5,422,821 | A * | 6/1995 | Allen | B07C 3/00 209/584 |
| 5,437,010 | A * | 7/1995 | Blackman | G07B 17/00193 700/180 |
| 5,541,845 | A * | 7/1996 | Klein | G01C 21/343 340/988 |
| 5,703,783 | A * | 12/1997 | Allen | B07C 3/00 209/584 |
| 5,802,492 | A * | 9/1998 | DeLorme | G01C 21/3476 340/990 |
| 5,831,860 | A * | 11/1998 | Foladare | G06Q 10/08 700/219 |
| 5,948,040 | A * | 9/1999 | DeLorme | G01C 21/36 340/990 |
| 5,995,950 | A * | 11/1999 | Barns-Slavin | G06Q 10/08 705/402 |
| 6,012,065 | A * | 1/2000 | Boucher | G06F 9/4493 |
| 6,018,725 | A * | 1/2000 | Boucher | G06F 8/60 705/401 |
| 6,064,995 | A * | 5/2000 | Sansone | G07B 17/0008 382/101 |
| 6,571,213 | B1 * | 5/2003 | Altendahl | G06Q 10/047 705/330 |
| 6,611,686 | B1 * | 8/2003 | Smith | G06Q 10/08 340/426.19 |
| 6,772,130 | B1 * | 8/2004 | Karbowski | G06Q 10/08 705/26.1 |
| 6,879,962 | B1 * | 4/2005 | Smith | G06Q 10/025 705/22 |
| 6,976,007 | B1 * | 12/2005 | Boucher | G06Q 10/08 705/28 |
| 7,058,614 | B1 * | 6/2006 | Wesseling | G07B 17/00435 705/408 |
| 7,334,184 | B1 * | 2/2008 | Simons | G06F 16/9535 715/234 |
| 8,131,651 | B1 * | 3/2012 | Bennett | G06Q 10/025 705/335 |
| 8,170,959 | B2 * | 5/2012 | Willoughby | G06Q 30/02 705/1.1 |
| 8,209,191 | B2 * | 6/2012 | Cook | G06Q 10/107 705/1.1 |
| 8,428,870 | B2 * | 4/2013 | Berry | G06Q 10/06 701/410 |
| 2001/0025268 | A1 * | 9/2001 | Hnat | G06Q 10/08 705/37 |
| 2001/0040513 | A1 * | 11/2001 | McDonald | G01S 13/75 340/8.1 |
| 2001/0044729 | A1 * | 11/2001 | Pomerance | G06Q 10/10 705/309 |
| 2002/0019759 | A1 * | 2/2002 | Arunapuram | G06Q 10/04 705/7.26 |
| 2002/0032573 | A1 * | 3/2002 | Williams | G06Q 10/08 705/335 |
| 2002/0046191 | A1 * | 4/2002 | Joao | G06Q 30/02 705/400 |
| 2002/0065738 | A1 * | 5/2002 | Riggs | G06Q 10/0631 705/334 |
| 2002/0099567 | A1 * | 7/2002 | Joao | G06Q 10/083 340/539.13 |
| 2002/0107785 | A1 * | 8/2002 | Melchior | G06Q 10/10 705/37 |
| 2002/0120475 | A1 * | 8/2002 | Morimoto | B65D 5/4212 705/4 |
| 2002/0138656 | A1 * | 9/2002 | Hickey | G06F 9/454 709/250 |
| 2002/0165729 | A1 * | 11/2002 | Kuebert | G06Q 10/08 705/338 |
| 2002/0169542 | A1 * | 11/2002 | Katayama | G01C 21/3682 701/428 |
| 2003/0033164 | A1 * | 2/2003 | Faltings | G06Q 10/02 705/6 |
| 2003/0037009 | A1 * | 2/2003 | Tobin | G06Q 10/08 705/65 |
| 2003/0040944 | A1 * | 2/2003 | Hileman | G06Q 10/02 705/5 |
| 2003/0046133 | A1 * | 3/2003 | Morley | G06Q 10/0631 705/7.12 |
| 2003/0046589 | A1 * | 3/2003 | Gregg | G06F 21/335 726/5 |
| 2003/0078779 | A1 * | 4/2003 | Desai | G06F 3/16 704/257 |
| 2003/0101143 | A1 * | 5/2003 | Montgomery | G07B 17/00435 705/62 |
| 2003/0167240 | A1 * | 9/2003 | Napier | G06Q 10/08 705/404 |
| 2003/0169900 | A1 * | 9/2003 | Woolston | G07B 17/00024 382/101 |
| 2003/0171962 | A1 * | 9/2003 | Hirth | G06Q 10/06315 705/7.25 |
| 2003/0182052 | A1 * | 9/2003 | DeLorme | G01C 21/26 701/533 |
| 2003/0188660 | A1 * | 10/2003 | Foth | G07B 17/00661 101/484 |
| 2004/0004119 | A1 * | 1/2004 | Baldassari | B07C 3/10 235/384 |
| 2004/0202154 | A1 * | 10/2004 | Aklepi | G06Q 10/08 370/352 |
| 2004/0243452 | A1 * | 12/2004 | Barton | G06Q 10/08 705/337 |
| 2004/0254808 | A1 * | 12/2004 | Bennett | G06Q 10/08 705/26.1 |
| 2004/0264739 | A1 * | 12/2004 | Das | B07C 3/00 382/101 |
| 2005/0038758 | A1 * | 2/2005 | Hilbush | G06Q 10/06311 705/402 |
| 2005/0131576 | A1 * | 6/2005 | De Leo | G06Q 10/08 700/223 |
| 2005/0154626 | A1 * | 7/2005 | Jones | G06Q 10/08 705/7.12 |
| 2005/0171632 | A1 * | 8/2005 | Witmond | G06Q 10/08 700/213 |
| 2005/0246359 | A1 * | 11/2005 | Robbins | B42D 15/006 |
| 2006/0122949 | A1 * | 6/2006 | Poulin | G07B 17/00024 705/402 |
| 2006/0136237 | A1 * | 6/2006 | Spiegel | G06Q 10/08 705/330 |
| 2006/0184403 | A1 * | 8/2006 | Scott | G06Q 10/00 705/338 |
| 2006/0229895 | A1 * | 10/2006 | Kodger, Jr. | G06Q 10/025 705/333 |
| 2006/0235739 | A1 * | 10/2006 | Levis | G06Q 10/08 705/1.1 |
| 2006/0282277 | A1 * | 12/2006 | Ng | G06Q 10/08 705/333 |
| 2007/0005452 | A1 * | 1/2007 | Klingenberg | G06Q 10/08 705/334 |
| 2007/0156416 | A1 * | 7/2007 | Foth | G06Q 10/08 705/336 |
| 2007/0156423 | A1 * | 7/2007 | Foth | G06Q 10/0832 709/206 |
| 2007/0192216 | A1 * | 8/2007 | Arnold | G06Q 10/08 705/28 |
| 2007/0294028 | A1 * | 12/2007 | Gray | G01C 21/343 701/533 |
| 2007/0299686 | A1 * | 12/2007 | Hu | G06Q 20/20 705/407 |
| 2008/0004967 | A1 * | 1/2008 | Gillen | G06Q 10/08 705/24 |

(56) References Cited

U.S. PATENT DOCUMENTS

| | | | | |
|---|---|---|---|---|
| 2008/0004995 A1* | 1/2008 | Klingenberg | ............ | G06Q 10/08 705/28 |
| 2008/0061967 A1* | 3/2008 | Corrado | ............. | G06K 7/10079 340/539.26 |
| 2008/0129493 A1* | 6/2008 | Fuentes | ................. | G06Q 10/08 340/539.22 |
| 2009/0037095 A1* | 2/2009 | Jani | ......................... | G06Q 10/08 701/533 |
| 2009/0094082 A1* | 4/2009 | Willoughby | ............ | G06Q 10/08 705/28 |
| 2009/0164390 A1* | 6/2009 | Calman | ..................... | B07C 3/00 705/400 |
| 2009/0170482 A1* | 7/2009 | Alessio | .................. | G06Q 10/08 455/414.1 |
| 2009/0281929 A1* | 11/2009 | Boitet | .................... | G06Q 10/08 705/28 |
| 2010/0058160 A1* | 3/2010 | Navarro | .............. | G06Q 10/0637 715/208 |
| 2010/0100233 A1* | 4/2010 | Lu | ............................. | B07C 3/18 700/226 |
| 2010/0125494 A1* | 5/2010 | Boss | ........................ | G06Q 10/08 705/14.19 |
| 2010/0138321 A1* | 6/2010 | Rathbun | ............... | G06Q 10/087 705/28 |
| 2010/0169000 A1* | 7/2010 | Overgoor | ............... | G01C 21/34 701/465 |
| 2010/0185476 A1* | 7/2010 | Eager | .................... | G06Q 10/063 705/7.11 |
| 2010/0205022 A1 | 8/2010 | Brown | | |
| 2010/0223173 A1* | 9/2010 | Kadaba | ...................... | B07C 3/00 705/34 |
| 2010/0228574 A1* | 9/2010 | Mundinger | ............ | G06Q 10/047 705/4 |
| 2010/0274609 A1* | 10/2010 | Shoemaker | ............. | G06Q 10/08 705/333 |
| 2010/0332402 A1* | 12/2010 | Kantarjiev | .............. | G06Q 10/08 705/304 |
| 2011/0161117 A1* | 6/2011 | Busque | .................. | G06Q 40/08 705/4 |
| 2011/0191202 A1* | 8/2011 | Keicher | ................. | G06Q 30/08 705/26.3 |
| 2011/0252112 A1* | 10/2011 | Glanton | ................. | G06F 21/604 709/217 |
| 2012/0051587 A1* | 3/2012 | Carpenter | ................... | B07C 3/00 382/101 |
| 2012/0078743 A1* | 3/2012 | Betancourt | ........... | G06Q 10/083 705/26.3 |
| 2012/0235791 A1* | 9/2012 | Donlan | ................... | G06Q 10/08 340/10.1 |
| 2012/0253548 A1* | 10/2012 | Davidson | ............... | G06Q 10/08 701/1 |
| 2012/0271769 A1* | 10/2012 | Franco | .................... | G06F 21/34 705/57 |
| 2013/0024390 A1* | 1/2013 | Zlobinsky | ............. | G06Q 10/087 705/319 |
| 2013/0033381 A1* | 2/2013 | Breed | ...................... | B60T 1/005 340/568.1 |
| 2013/0094693 A1* | 4/2013 | Bolton | ............... | G06Q 10/0833 382/101 |
| 2013/0103606 A1* | 4/2013 | Holliday | ................. | G06Q 50/28 705/333 |
| 2013/0138574 A1* | 5/2013 | McCall | .............. | G06Q 10/0834 705/334 |
| 2013/0144429 A1* | 6/2013 | Ragusa | ...................... | B07C 3/00 700/224 |
| 2013/0198300 A1* | 8/2013 | Briggman | ............... | H04L 51/22 709/206 |
| 2013/0297523 A1* | 11/2013 | Karr | ..................... | G06Q 10/083 705/330 |
| 2013/0325893 A1* | 12/2013 | Asay | .................. | G06Q 10/0833 707/769 |
| 2013/0342343 A1 | 12/2013 | Harring et al. | | |
| 2014/0136632 A1* | 5/2014 | Rauh | ....................... | H04L 51/08 709/206 |
| 2014/0258243 A1* | 9/2014 | Bell | ....................... | H04L 67/306 707/690 |

OTHER PUBLICATIONS

Final Office Action for U.S. Appl. No. 13/705,935 dated Apr. 16, 2015, pp. 1-31, USPTO.

Office Action for U.S. Appl. No. 13/705,935 dated Oct. 3, 2014, pp. 1-25, USPTO.

FedEx®, FedEx Mobile Shipping App for iPhone®, Depicting iPhone displaying "Create Shipment"; http://www.fedex.com/us/mobile/iphone/index.html?location=desktop, printed Aug. 23, 2012, pp. 1-2.

FedEx®, FedEx Mobile Shipping App for iPhone®, Depicting iPhone displaying "Rates & Transit Times"; http://www.fedex.com/us/mobile/iphone/index.html?location=desktop, not dated, pp. 1-2.

FedEx®, FedEx Mobile Shipping App for iPhone®, Depicting iPhone displaying "Schedule a Pickup"; http://www.fedex.com/us/mobile/iphone/index.html?location=desktop, not dated, pp. 1-2.

FedEx®, FedEx Mobile Shipping App for iPhone®, Depicting iPhone displaying a FedEx barcode; http://www.fedex.com/us/mobile/iphone/index.html?location=desktop, printed Aug. 23, 2012, pp. 1-2.

FedEx®, FedEx Mobile Shipping App for iPhone®, Depicting iPhone displaying a map; http://www.fedex.com/us/mobile/iphone/index.html?location=desktop, printed Aug. 23, 2012, pp. 1-2.

FedEx®, FedEx Mobile Shipping App for iPhone®, Depicting iPhone, displaying "All Shipments"; http://www.fedex.com/us/mobile/iphone/index.html?location=desktop, printed Aug. 23, 2012, pp. 1-2.

FedEx®; "What Numbers Can I Track?" published by www.fedex.com on Sep. 24, 2012; p. 1 of 1.

McBride, Kenneth Thomas, et al., U.S. Appl. No. 13/705,935, "Visual Graphic Tracking of Item Shipment and Delivery," filed Dec. 5, 2012, pp. 1-50, FIGS. 1-11.

Norco, "Norco Overnite", http://www.shi povernite.com/v2/NorcoOvernite.mvc/NorcoOvernite; copyright 2012, printed Nov. 14, 2012; 1 page.

Request delivery intercept, www.ups.com, Oct. 22, 2011, p. 1. (Year: 2011).

TransGuardian, "Insured Parcel Shipping (IPS)", http:/www.transguardian.com/; copyright 2012, printed Nov. 28, 2012; 2 pages.

United Parcel Service; "Request Delivery Intercept" published by www.ups.com on Oct. 22, 2011; p. 1 of 1.

United States Postal Service, "Business Service Network eService", https://www.usps.com/nationalpremieraccounts/psn.htm; copyright 2012, printed Nov. 14, 2012; 1 page.

United States Postal Service, "Intelligent Mail® Barcode Questions & Answers"; http://ribbs.usps.gov/OneCodeSolution/USPSIMB_QandA.pdf; Revision 3.4, Sep. 17, 2008; 1 page.

United States Postal Service, "Mail Tracking & Reporting, 1Mb Tracing™", https://mailtracking.usps.com/mtr/landing/resources/confirm/landingConfirmLaunch.jsp; copyright 2012, printed Aug. 16, 2012; 1 page.

United States Postal Service, "Mail Tracking & Reporting, Apply for 1Mb Tracing™", https://mailtracking.usps.com/mtr/landing/resources/confirm/landingApply.jsp; copyright 2012, printed Aug. 16, 2012; 2 pages.

United States Postal Service, "Mail Tracking & Reporting, How IMb Tracing™ Works", https://mailtracking.usps.com/mtr/landing/resources/confirm/landingHowWorks.jsp; copyright 2012, printed Aug. 16, 2012; 1 page.

United States Postal Service, "USPS.com, Intelligent Mail", http://www.usps.com/business/intelligent-mail.htm; copyright 2012, printed Aug. 16, 2012; 1 page.

United States Postal Service, Intelligent Mail® Small Business Tool; https://gateway.usps.come/bcg/imsbTool.htm; copyright 2012, printed Nov. 14, 2012; 1 page.

(56) References Cited

OTHER PUBLICATIONS

United States Postal Service®, "USPS Package Intercept®," from USPS Package Intercept: FAQ's, https://pi.usps.com/cpi/faq.jsp; printed Feb. 7, 2013, 1 page.
Office Action for U.S. Appl. No. 13/705,935 dated Sep. 20, 2016, pp. 1-31, USPTO.
Final Office Action for U.S. Appl. No. 13/705,935 dated Sep. 9, 2015, pp. 1-31, USPTO.

* cited by examiner

FIG. 4

Manifest Intercept/Rescue Request and Instructions

| Mail Piece ID | From | To |
|---|---|---|
| XXYYZZZ2B | City A | City B, St — 621 |
| XXWWZZZ3A | City A | City C, St — 622 |
| XXAAZZZ4C | City A | City W, St — 623 |

620

Mail Pieces sent by Carrier: [Carrier C ▽] — 607

Date Sent: [XX/YY/ZZ] — 612

Intercept/Rescue Instructions:

420 — ☐ Return Mail Piece to Orginal From Address
430 — ☐ Re-Route Mail Piece to New Address: [ 435 ]
440 — ☐ Confiscate Mail Piece
442 — ☐ Destroy
444 — ☐ Direct to: [ 445 ]

450 — ☐ Change Carrier to: [ 455 ▽]
460 — ☐ Upgrade Delivery Service to: [ 465 ▽]
470 — ☐ Add/Upgrade Insurance for: $ [ 475 ]
480 — ☐ Add Return Receipt
482 — ☐ Remove Return Receipt
483 — ☐ Add Certified Mail ( Submit for Payment ) — 490

SYSTEMS AND METHODS FOR MAIL PIECE INTERCEPTION, RESCUE TRACKING, AND CONFISCATION ALERTS AND RELATED SERVICES

CROSS REFERENCE TO RELATED APPLICATIONS

This application is a continuation of U.S. patent application Ser. No. 13/828,800, titled "SYSTEMS AND METHODS FOR MAIL PIECE INTERCEPTION, RESCUE TRACKING, AND CONFISCATION ALERTS AND RELATED SERVICES," filed on Mar. 14, 2013, which claims priority to, and is a continuation-in-part of, U.S. patent application Ser. No. 13/705,935, titled "VISUAL GRAPHIC TRACKING OF ITEM SHIPMENT AND DELIVERY", filed on Dec. 5, 2012 (the "Parent Application"), each of which is incorporated herein in full by reference as if stated in full herein.

FIELD OF THE INVENTION

The field of the present invention is mail piece shipment and delivery tracking, and more specifically, providing en route mail piece interception, mail piece rescue tracking, and confiscation alerts and services.

BACKGROUND OF THE INVENTION

At present, the United States Postal Service (the "USPS") provides a domestic USPS PACKAGE INTERCEPT® service that allows USPS customers the ability to request that a mail piece that the USPS customer has sent to a domestic address using the USPS be intercepted prior to its delivery. See USPS, https://pi.usps.com/cpi/faq.jsp ("1. What is USPS Package Intercept?"), © 2013 (international destinations or destinations that require customs forms are not included in the service).

The term "mail piece" as used herein will be understood to apply to any type of item for delivery by a carrier, including, without limitation, packages, envelopes, and any other types of mail items.

According to the USPS, after a package has been sent using the USPS, the sending USPS customer may place a package intercept request—a commercial customer may submit an online request to intercept a mail piece through the USPS "Business Customer Gateway" (BCG) if the commercial customer is registered BCG user, has a permit account that is linked to a USPS "Centralized Account Payment System" (CAPS) Debit Account, has a Mailer ID, and has "Managed Mail" activity; a retail USPS customer may submit a request to intercept a mail piece by completing a USPS form; both commercial and retail customers would pay the USPS fees for the intercept service and fees for any additional services that the customer may request—the fees for a commercial customer would be deducted from that customer's permit account/debit account; a retail customer would need to pay the fee with some form of payment, such as cash, or credit card, acceptable to the USPS. See USPS, https://pi.usps.com/cpi/faq.jsp ("2. How is USPS Package Intercept Requested?"), © 2013.

According to the USPS, before placing a request to intercept a mail piece, a USPS customer should first validate the status of their mail piece by using the USPS Track & Confirm tool (through the USPS online website; the use of which requires a pre-assigned tracking identifier). See USPS, https://pi.usps.com/cpi/faq.jsp ("9. What Should a Customer Do Before Placing a USPS Package Intercept Request?"), © 2013.

According to the USPS, once a request to intercept a mail piece has been submitted, information about the request would be sent to the relevant destination delivery unit for the address on the mail piece in order to intercept the mail piece before it is delivered. See USPS, https://pi.usps.com/cpi/faq.jsp ("1. What is USPS Package Intercept?"), © 2013.

Similarly, private carrier United Parcel Service ("UPS") provides a package recipient with the ability to modify delivery instructions for a particular package. Generally though, in order to modify UPS delivery instructions, a UPS recipient must be registered with UPS.

Presently, governmental and private carriers do not provide for mail piece "manifest" interception services. For example, it would be useful for a user, whether an individual or a company, that may have sent a number of mail pieces, each to a separate address, to be able to submit a single "manifest" request to intercept each mail piece before it is delivered. For example, in a situation where the sending user realizes that there is a mistake in a letter sent with a number of mail pieces, or realizes that the wrong item has been sent in each of a number of mail pieces, or the like, it would be useful for the sending user to be able to intercept all such mail pieces, and be able to provide the relevant carrier with manifest-wide and/or mail-piece-specific intercept and subsequent measure instructions. For example, if a sending user wanted to have all of the relevant mail pieces returned to the sending user, it would be helpful to facilitate a sending user being able to provide a manifest-wide instruction to intercept all of the mail pieces identified by the intercept manifest and return all of them to a particular address, such as the sending user's return address. Alternatively, a sending user may want to provide mail-piece-specific intercept and subsequent measure instructions. For example, a sending user may want to indicate that some mail pieces identified on the intercept manifest should be returned to a sending-user-provided address, and that other mail pieces identified on the intercept manifest be sent to another sending-user-provided address.

A way is needed to provide sending users with a mail piece intercept "manifest" to facilitate interception by the relevant carrier of a number of mail pieces, and to facilitate manifest-wide and/or mail-piece-specific intercept and subsequent measure instructions.

Further, presently, governmental and private carriers do not provide for mail piece monitoring and providing rescue alerts to relevant users. For example, for a mail item that is sent from Los Angeles to be delivered to an address in Washington State, neither governmental nor private carriers would currently alert a sending customer, or indeed would even themselves be aware, if the mail piece had remained at any particular carrier processing location for a longer period of time that would normally be expected, or, was off route in, for example, New Jersey. For a mail piece that might contain, for example, critical components for a recipient's device, either or both the sending and receiving users might want to be alerted of such processing issues or off-route situations so that alternative actions could be taken. For example, the relevant receiving user might want to order, or the relevant sending user might want to send, an alternative replacement for express delivery and recall the off-route component.

As another example, if user sent a mail piece using a particular carrier from Los Angeles to an address in Washington State, and a particular processing facility for that carrier, for example, a processing hub, in between the origin and destination started experiencing an issue, such as a weather-related shut-down, or the like, the sending user might want to send a replacement using, for example, a different delivery service by the same carrier, or another carrier (for which no such processing issues might have occurred) to the recipient and recall the original mail piece. Alternatively, the sending user might want to alert the carrier, or might want the carrier to be automatically alerted, of the mis-routing of the mail piece and give the relevant carrier an opportunity to rescue the mail piece and direct it to its proper destination.

A way is needed to monitor mail pieces to determine whether or not they are following a projected route, and/or whether or not issues that might impact their delivery and/or their delivery schedule, may have arisen along their projected route; a way is needed to provide an alert to the relevant user(s) and/or parties of any such issues, including miss-routing, and to facilitate alternative user/party measures and/or rescue services by the relevant carrier for the subject mail piece.

Yet further, governmental and private carrier services do not provide for mail piece intervention by parties other than the sender, and in some limited cases, the subject recipient. However, it would be helpful if the above-mentioned alerts could also be provided to other potentially interested parties, such as, for example, an insurer.

A way is needed to allow an authorized user to designate other authorized parties to receive such alerts.

Still further, it would be helpful, for certain circumstances, for certain types of entities and/or parties to be able to alert the relevant carrier of a suspicious mail piece so that the mail piece can be confiscated. For example, if a service provider that facilitates production of carrier-recognized shipping indicia should discover, such as from internal rules, that a particular set of mail piece indicia was produced by a third-party hacker using an authorized user's account, then it would be helpful for such a service provider to be able to generate an intercept request for that mail piece with instructions to the relevant carrier to confiscate the mail piece.

A way is needed to facilitate an authorized party to instruct the relevant carrier to confiscate a particular mail piece.

SUMMARY OF THE INVENTION

Exemplary embodiments of the present invention would project a route and a delivery schedule for relevant mail pieces and would monitor carrier-recorded tracking events for those mail pieces to determine whether or not actual tracking events are following the projected route and the projected schedule, and/or whether or not issues that might impact their delivery and/or their delivery schedule, may have arisen along their projected route; such exemplary embodiments would provide an alert to the relevant user(s) and/or other authorized parties and/or relevant carrier(s) and would facilitate user interaction by the relevant user(s) and/or parties to provide intercept and/or rescue and/or confiscation instructions; exemplary embodiments would facilitate automatic interfaces with the relevant carriers and delivery services for the subject mail piece to resolve rescue, item loss, insurance coverage, postage refund, intervention and/or confiscation instructions and issues; exemplary embodiments would communicate intercept and/or rescue and/or confiscation instructions to a projected next mail piece processing facility for the relevant carrier, and if appropriate, would communicate intercept and/or rescue and/or confiscation instructions to a projected final mail piece processing facility before projected delivery of the mail piece to the destination address.

Exemplary embodiments of the present invention would allow an authorized user to designate other authorized parties to receive such alerts.

Exemplary embodiments of the present invention would facilitate an authorized party to instruct the relevant carrier to confiscate a particular mail piece.

Exemplary embodiments of the present invention would provide sending users with a mail piece intercept "manifest" to facilitate interception by the relevant carrier of a number of mail pieces and to facilitate manifest-wide and/or mail-piece-specific intercept instructions.

BRIEF DESCRIPTION OF THE DRAWINGS

These and other features of the present invention are more fully set forth in the following description of exemplary embodiments of the invention. The description is presented with reference to the accompanying drawings in which:

FIG. 4 is an illustrative graphic depiction of an exemplary Mail Piece Intercept/Rescue Requests and Instructions user interface, in an exemplary embodiment of the present invention;

FIG. 6 is an illustrative graphic depiction of an exemplary Manifest Intercept/Rescue Request and Instruction interface in an exemplary embodiment of the present invention;

DETAILED DESCRIPTION OF THE INVENTION

Exemplary Internet-Based Indicia Service Provider System.

Some exemplary embodiments of the present invention would be implemented, for example, by an Internet-based indicia service provider system. Such an exemplary Service-provider embodiment would not require that a sending user register with each carrier in order to request mail piece intercept and/or rescue service or to provide payment for an intercept service to each relevant carrier. Rather, such an exemplary Service-provider embodiment would, as an option, utilize the registration and account of the sending user with the relevant Internet-based Service provider. Alternative, such an exemplary Service-provider embodiment could also provide for user selection of other types of payment (e.g., credit cards, debit cards, ATM accounts, PAYPAL® accounts, electronic cash accounts, or other types of payment accounts or information, whether now known or in the future discovered).

As will be understood by someone with ordinary skill in the art, implementation using the Internet and using an Internet-based indicia service provider system are exemplary and illustrative and are not limitations of the invention. Rather, other means of communication and other implementation approaches could be used without departing from the spirit of the present invention. However, for illustrative purposes, exemplary Internet-based, Service-provider embodiments will be disclosed.

Exemplary User Interface for Requesting Intercept Tracking and/or Rescue Alerts.

An exemplary Service-provider embodiment would provide an exemplary user interface through which users would request carrier-specific, delivery-service-specific shipping/postage indicia (sometimes referred to herein as "shipping indicia") for shipping a particular mail piece and for other related services.

In addition to requesting shipping indicia, some exemplary embodiments would provide a user of the relevant Service provider system an option to request (e.g., for an additional price, or as a value-added service) tracking/monitoring of a mail piece, for example, for which the user had used, or would be using, the exemplary Service provider system to create shipping indicia. In some exemplary embodiments, the user would be provided with the option to request such mail piece tracking/monitoring when requesting creation of carrier-specific shipping/postage indicia for sending a mail piece; alternatively, the user would be given the option to request such mail piece tracking/monitoring subsequent to having printed such shipping/postage indicia.

Alternative exemplary embodiments could provide tracking/monitoring as a matter of course for each piece (e.g., as a value-added service) for which the relevant embodiment was used to create shipping indicia.

Figure 1:
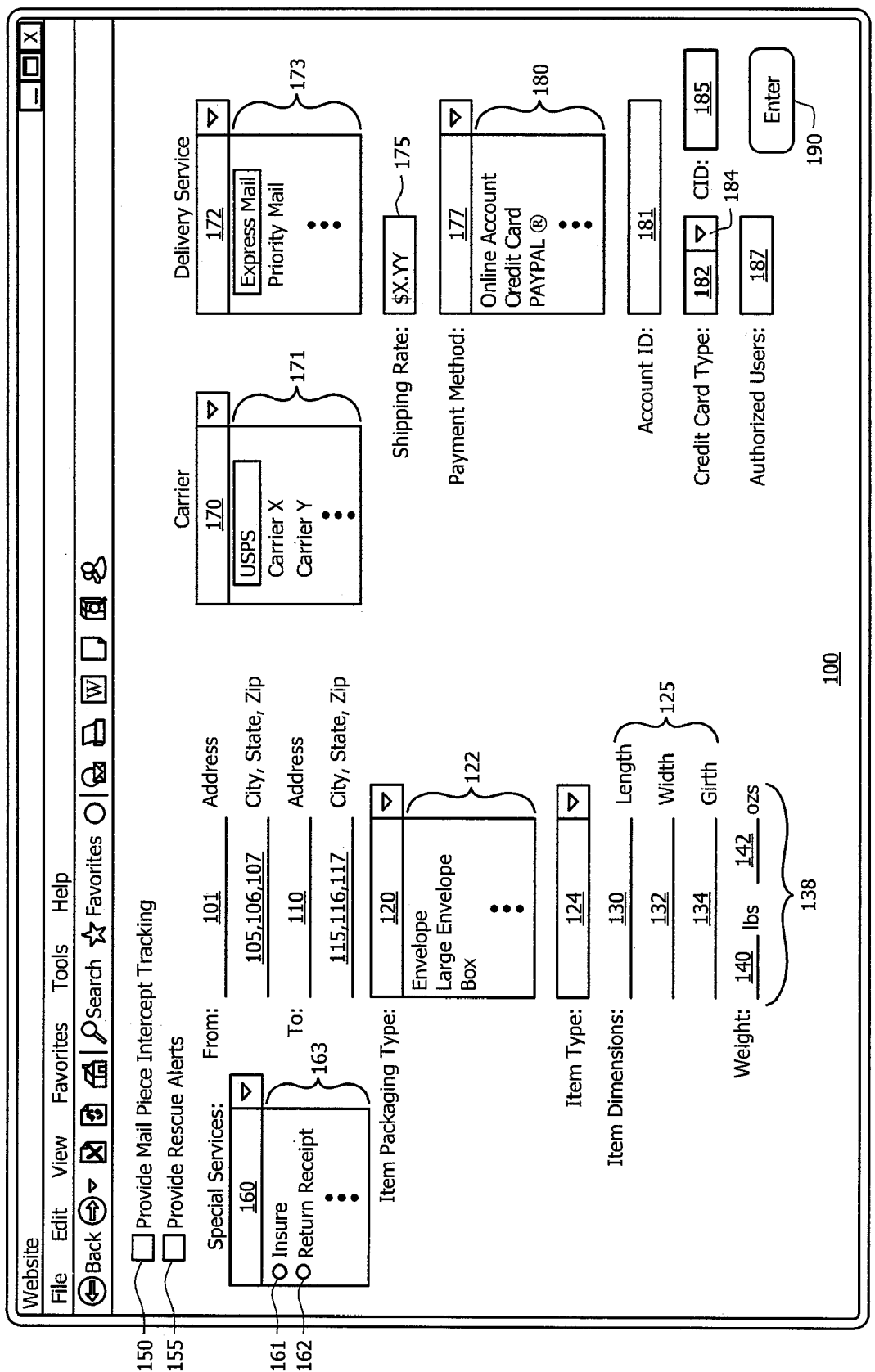
FIG. 1 is an illustrative graphic depiction of an exemplary mail piece shipping information input user interface in an exemplary embodiment of the present invention.

Exemplary embodiments of the present invention would provide an exemplary user interface, as illustratively depicted in FIG. 1, that would provide input fields for the user to input shipping information for a particular mail piece, including, for example: a From (return) address 101, city, state and postal code (zip code) 105-107, delivery address information 110 (address), 115-117 (city, state and zip) and information regarding such things as the item packaging type 120 (selectable, e.g., from an exemplary drop-down menu 122 of exemplary packaging types), the item type 124 (selectable from an exemplary item type drop down menu (not shown), item dimensions 130 (e.g. Length), 132 (e.g. Width) and 134 (e.g., Girth) and item weight 138 (e.g., in pound 140 and ounces 142), and a Carrier 170 (selectable from an exemplary pull-down menu 171 of Carriers supported by the exemplary embodiment), and an exemplary Carrier-dependent Delivery Service 172 from an exemplary Carrier-dependent Delivery Service menu 173. As will be understood by someone with ordinary skill in the art, each Carrier may have Carrier-specific delivery services—although the services provided by each Carrier may provide similar timing and functions, each Carrier may have a Carrier-specific name for its delivery services; the exemplary Delivery Service pull-down menu 173 will be displayed after a user has selected a Carrier 170 from the exemplary Carrier pull-down menu 171 so that the exemplary Delivery Service pull-down menu 173 will display the names specific to the selected Carrier.

The exemplary embodiment would provide an exemplary input field for the user to request Mail Piece Intercept Tracking 150, Rescue Alerts 155 and one or more special services 160 (by clicking on all special services that the user wants to select from an exemplary multi-selectable special service pull-down menu 163). Exemplary special services would include, for example, Insure 161, Return Receipt 162, etc. In one exemplary embodiment, the exemplary special service pull-down menu 163 would be carrier-dependent and delivery-service-dependent. That is, the exemplary special service pull-down menu 163 would list all special services that would be available by the user-selected carrier and the user-selected delivery service. In other exemplary embodiments, the exemplary special service pull-down menu 163 would generally list services commonly provided by all, or most, carriers.

Once a user has input return address (101, 105-107) and delivery address information (110, 115-117) for shipping a particular mail piece and information regarding such things as the item packaging type 120, the item type 124, item dimensions (130, 132 and 134) and item weight (138, 140, 142), and once a user has selected a Carrier 170 and a Delivery Service 172 for shipping the particular mail piece and had selected any special services, the exemplary embodiment would obtain from relevant carrier databases information to, and would, calculate and display a shipping rate 175 according to the selected Carrier's shipment/postage rating rules for shipping the particular mail piece using the selected Delivery Service.

The user could then modify various input and data selections on the exemplary user interface illustratively depicted in FIG. 1, which would cause the exemplary embodiment to recalculate the Shipping Rate with each substantive change that affected the shipping rate calculation.

In the exemplary embodiment, before being able to print shipping indicia, the user would need to indicate a Payment Method 177 (such as, for example, selecting a payment method from an exemplary payment method pull-down menu 180), and the relevant user's account ID 181 (such as an account ID for an account with the relevant Internet Service provider, or, if appropriate, a credit card account ID 185, and the associated credit card type 182 (which may be selected from a pull-down menu that would be displayed by the user clicking the exemplary credit card pull-down menu button 184) and CID); the user's input of the Payment Method 177 and other payment information would be done in order to pay for creation of shipping indicia and any other services that the user may have indicated.

Once the user is satisfied with the input of the above-describe information and with the above-mentioned selections, and once the user had input the required payment information, the user could click an exemplary "Enter"

button 190, which would cause the exemplary embodiment to use the information that the user had provided in conjunction with information that the exemplary embodiment system would obtain from relevant carrier databases to generate the carrier-specific, delivery-service-specific shipping/mailing indicia. If the user had requested either Mail Piece Intercept Tracking (or in embodiments that would provide that service as a matter of course), or Rescue Alerts, the exemplary embodiment would generate exemplary carrier-specific, delivery-service-specific shipping/mailing indicia that would include generation of exemplary tracking indicia (which may be separate from, or incorporated into, the carrier-specific, delivery-service-specific shipping/mailing indicia), and would generate exemplary label(s) comprising a representation of the generated exemplary carrier-specific, delivery-service-specific shipping/mailing indicia and tracking indicia.

Exemplary tracking of a mail piece (sometimes referred to herein simply as a "piece" or an "item") would involve an exemplary mail-piece-specific tracking identifier being physically associated with the piece. That is, some identifier, whether an alphanumeric identifier, a machine-readable graphic symbology (e.g., a barcode, a computer-generated indicia, or the like), a micro-ID-chip, a GPS-enabled ID chip, an RFID, or some other device, code or the like, whether now known or in the future discovered, that would be substantially unique, or unique, such as during a particular period of time, that would serve to identify the particular mail piece, such as during a particular period of time.

Exemplary mail-piece-specific tracking identifiers are sometimes simply referred to herein as "tracking indicia", but will be understood by someone with ordinary skill in the art to include any type of identifier, whether now known or in the future discovered, that would serve to identify the particular mail piece, such as during a particular period of time.

Exemplary Post-Indicia-Creation Requests for Intercept Tracking and/or Rescue Alerts.

In a situation where a user had paid for and printed shipping indicia but had not requested either Mail Piece Intercept or Rescue Alerts, and later wanted to request one or both of those services, the user could access the user's exemplary Shipping History 200, an illustrative depiction of which is provided in FIG. 2. As illustratively depicted in FIG. 2, each mail piece in the user's shipping history would be, for example, identified, e.g., by date 210, From City 215, and Destination Address 220; each mail piece would provide a user indicator for requesting Intercept Tracking 240 and/or Rescue Alerts 230.

As mentioned above, in an exemplary embodiment that automatically provides, as a matter of course, Intercept Tracking and/or Rescue Alerts for all mail pieces for which the exemplary embodiment is used to generate shipping indicia, when the indicia for each mail item is generated, the exemplary embodiment would automatically generate the appropriate exemplary carrier-specific, delivery-service-specific shipping/mailing indicia that would include generation of exemplary tracking indicia (which may be separate from, or incorporated into, the carrier-specific, delivery-service-specific shipping/mailing indicia).

However, in an exemplary embodiment that does not provide such tracking and/or rescue services as a matter of course, the user may still be able to request the services after indicia for the mail piece has been printed. If, as depicted in FIG. 2, a user requested either Intercept Tracking or Rescue Alerts for a mail piece from the user's exemplary Shipping History 200, the exemplary embodiment would access computer-accessible memory, such as system databases, to obtain information associated with the relevant mail piece and the relevant carrier and delivery service, and would determine whether or not indicia for the particular mail piece had been printed for a carrier and delivery service that, as a matter of course, included generation of tracking indicia. For example, if indicia had been printed for a mail piece to be sent using USPS Express Mail, then the exemplary would determine that it had generated a USPS Express Mail Tracking identifier for the particular mail piece; the exemplary embodiment would obtain the USPS Express Mail Tracking identifier for the particular mail piece and would then use that USPS Express Mail Tracking identifier to track the mail piece and, if rescue services were requested, provide rescue alerts if appropriate.

On the other hand, in an exemplary embodiment that does not provide such tracking and/or rescue services as a matter of course, if the exemplary embodiment determines that no tracking indicia had automatically been generated for the particular mail piece, then the exemplary embodiment would ask the user questions to determine whether or not the mail piece had already been sent. If the user indicates that the mail piece has not yet been sent, the exemplary embodiment would offer the user the option, for, e.g., an additional charge, to generate tracking indicia for the mail piece and provide the Intercept/Rescue tracking services. If the user indicates a request for Intercept Tracking and/or Rescue Alerts for more than one mail piece, the exemplary embodiment would make the above-mentioned determinations regarding the previous generation of tracking indicia and/or whether the mail piece has already been sent for each item for which the additional services have been requested; the exemplary embodiment would calculate and accumulate charges for each mail piece for which such services are requested as appropriate, and would provide a total in the Charge field 250 illustratively depicted in FIG. 2.

Figure 2:
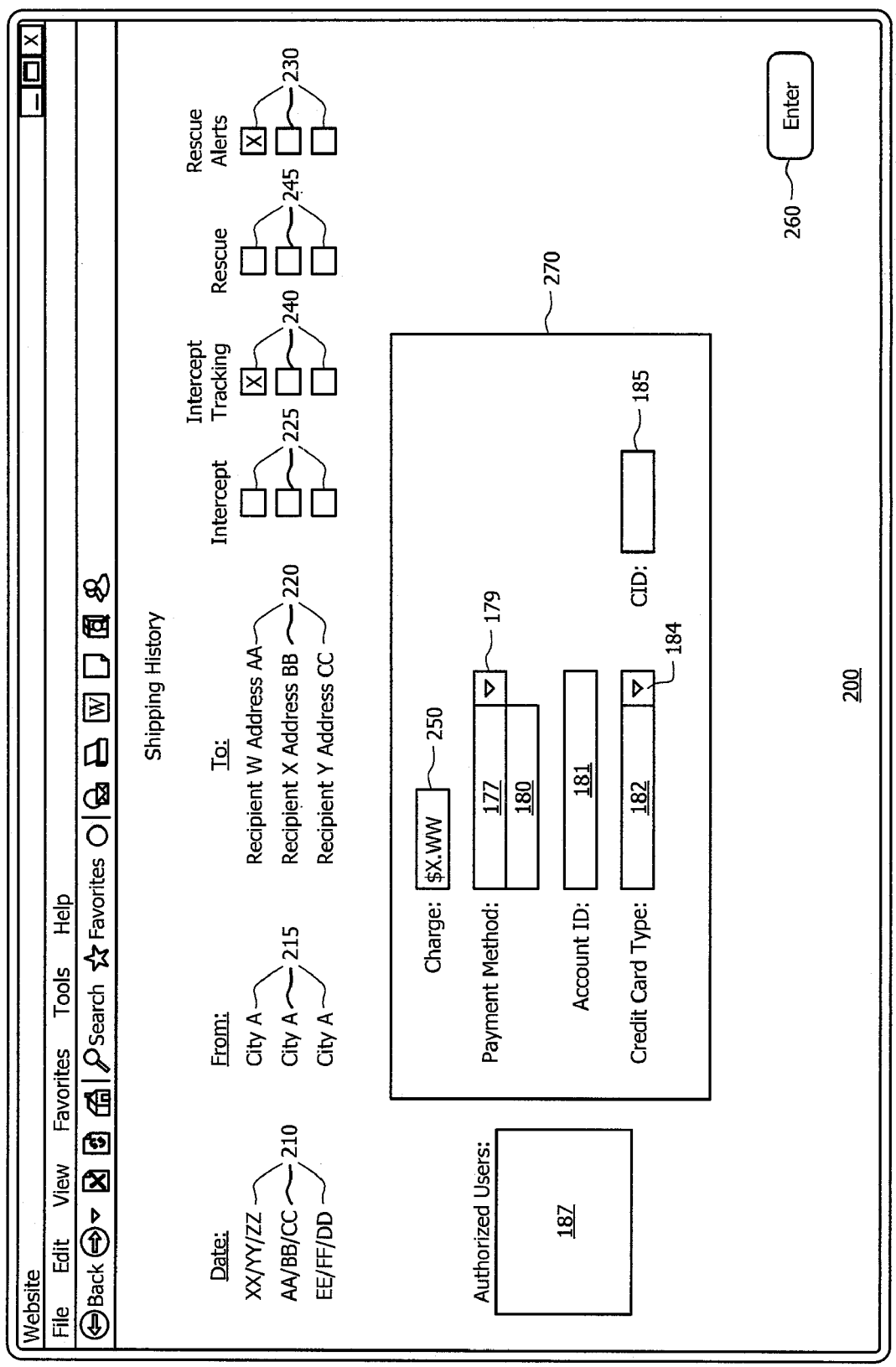
FIG. 2 is an illustrative graphic depiction of an exemplary Shipping History user interface in an exemplary embodiment of the present invention.

As depicted in FIG. 2, the user would be prompted to enter the user's Payment Method 177, Account ID 181, and if appropriate, Credit Card Type 182 and CID (185) in order to pay for the Charge amount 250. In the exemplary embodiment, the exemplary charge and payment information (250, 177, 179, 180, 181, 182, 184 and 185) would comprise an exemplary inset charge and payment window 270 in the larger exemplary Shipping History screen 200; the exemplary inset charge and payment window 270 would not appear on the larger exemplary Shipping History screen 200 unless and until a user requests Intercept Tracking, Rescue Alerts, or Intercept 225 or Rescue 245 services, which will be described further below.

Once the user is satisfied with the selections and payment information, the user would click the Enter button 260 for the exemplary Shipping History screen 200; doing so would cause the exemplary embodiment, if Intercept Tracking and/or Rescue Alerts had just been requested, to generate carrier-specific, delivery-service-specific tracking indicia for the mail piece and would instruct the user to affix the separately generated carrier-specific, delivery-service-specific tracking indicia to the mail piece before shipping/mailing it.

The exemplary Shipping History 200 will maintain a record of the services requested and will display each requested service indicator for each mail piece listed on the exemplary Shipping History 200. That is, if a user had initially requested, for example, Intercept Tracking for a particular mail piece, then when the user's Shipping History 200 is displayed, that Shipping History 200 would show the relevant Intercept Tracking indicator for the relevant mail piece checked. Further, if the user requests Intercept Tracking and/or Rescue Alerts for a mail piece after having printed shipping indicia, once the requests have been submitted (e.g., paid for), the relevant user's Shipping History 200 would, from then on (i.e., when the user later accesses the user's Shipping History 200), show the Intercept Tracking 240 and/or Rescue Alert 230 indicators checked for that mail piece.

As will be understood by someone with ordinary skill in the art, the above-described exemplary Charge 250 is illustrative and not a limitation of the present invention. Rather, in some exemplary embodiments, there would be no additional charge for such services.

Requests for Intercept and/or Rescue Services.

As also depicted on the exemplary Shipping History 200 illustratively shown in FIG. 2, a user would be provided with a selectable indicator 225 for requesting Intercept services for a mail piece and with a selectable indicator 245 for requesting Rescue services for a mail piece.

As will be understood by someone with ordinary skill in the art, there would be multiple ways for facilitating a user's request for Intercept and/or Rescue services. An exemplary description of the services will be provided in more detail below. However, one approach for a user to submit a request for such services is depicted in FIG. 2.

Alternatively, or additionally, when a user receives a Rescue alert for a particular mail piece from the exemplary embodiment, the exemplary embodiment would provide an interactive interface, such as in the form of an interactive questionnaire, that would facilitate the user's input of instructions for rescuing the particular mail piece. For example, when the exemplary embodiment determines that a rescue situation (described in more detail below) has occurred for a particular mail piece, the exemplary embodiment could notify the user, such as with an email message, a text to the user's cell phone, or the like. In one exemplary embodiment, the exemplary alert message would provide a link, that if clicked by the user, would navigate the user's computer's or cell phone's browser to an interactive questionnaire that would gather the user's instructions for rescuing that package.

An exemplary interactive questionnaire would prompt the user to enter an indication of the user's answers to such questions as, for example: Do you want the carrier to reroute this mail piece to the original destination address?; Or to the return address?; Or to a new address, and if so, please specify the new address; Do you want to insure this mail piece on its re-routed delivery?; Do you want to change the level of delivery service for this mail piece?; And if so, to what delivery service?; Do you want to change carriers for delivery of this mail piece?; And if so, which carrier do you want to use and which delivery service by that carrier do you want to use?; Or do you want the carrier to confiscate and destroy this mail piece? If so, do you want confirmation by the carrier of the final disposition of this mail piece?

In a manner similar to that described for requesting services from the exemplary Shipping History 200 (depicted in FIG. 2), an exemplary interactive questionnaire would provide a charge and payment information section to collect information from the user to pay for the additional services.

If the user had requested (and e.g., paid for) insurance for the mail piece when sending it, the exemplary embodiment would request (not shown) that the user indicate whether or not the insurer should receive Rescue Alerts. In other exemplary embodiments, insuring a mail piece would automatically authorize the relevant insurer to receive Rescue Alerts for that mail piece. In other exemplary embodiments, insuring a mail piece would automatically activate Rescue Alerts and incur any appropriate charges for that service, and would automatically authorize the relevant insurer to receive Rescue Alerts for that mail piece.

Exemplary Intercept/Rescue Notification.

Some exemplary embodiments would, either upon receipt and processing of an interception request for a particular mail piece, or as a matter of course, automatically for each mail piece for which the exemplary embodiment is used to facilitate creation of carrier-specific mailing/shipping indicia, project a delivery route and delivery schedule for the mail piece. Then, in response to an interception request by an authorized party (e.g., a sender/shipper/seller, or a recipient/buyer, or other authorized party, e.g., the carrier, an insurer, the postage/shipping indicia provider, or the like), such an exemplary embodiment would automatically generate an intercept notification (and intercept instructions) for the relevant mail piece to the relevant carrier. Such an exemplary embodiment would then automatically provide the intercept notification (and intercept instructions) for the relevant mail piece to the relevant carrier, such through an Applications Program Interface ("API") for the relevant carrier.

An exemplary intercept/rescue notification would comprise, among other things, an identification of the mail piece, such as a mail piece identifier. As mentioned elsewhere herein, an exemplary mail piece identifier may comprise an alphanumeric identifier, a machine-readable graphic symbology (e.g., a barcode, a computer-generated indicia, or the like), a micro-ID-chip, a GPS-enabled ID chip, an RFID, or some other device, code or the like, whether now known or in the future discovered, that would be substantially unique, or unique, such as during a particular period of time, that would serve to identify the particular mail piece, such as during a particular period of time. Depending on the type of exemplary mail piece identifier, an exemplary intercept notification may comprise the exemplary mail piece identifier and/or relevant information about the exemplary mail piece identifier.

Optionally, an exemplary intercept/rescue notification would further comprise other identifying information for the mail piece. For example, an exemplary intercept notification may further comprise the destination address for the mail piece, the return address for the mail piece, and/or the mail piece's packaging type, item type, item dimensions and item weight.

Some exemplary intercept/rescue notifications may require physical interception of a mail piece. For example, an exemplary intercept/rescue notification may further comprise exemplary physical intercept instructions. Exemplary physical intercept/rescue instructions may comprise, for example: an instruction to return the particular mail piece to the sending user's return address (sometimes referred to herein as an Exemplary Return Intercept Instruction); or an instruction to re-route the particular mail piece to a new destination address, with an identification of the new destination address (sometimes referred to herein as an Exemplary Re-Routing Intercept Instruction); or an instruction to confiscate, and associated instructions, regarding the particular mail piece. As described further elsewhere herein, a confiscation request may comprise, for example, an identification of the intercept requesting party and an authorization for the intercept requesting party to issue a confiscation request; or an instruction to confiscate the particular mail piece and direct it to a new party, with an identification of the intercept requesting party and an authorization for the intercept requesting party to issue a confiscate and redirect request.

Some exemplary intercept/rescue instructions may comprise exemplary service-related changes and/or upgrade instructions for a particular mail piece; such exemplary service-related changes and/or upgrade instructions may not necessarily require physical interception of the mail piece, but may instead require a carrier-system notification. In some exemplary embodiments, whether or not exemplary service-related changes and/or upgrade instructions may require physical interception of the mail piece may depend on rules of the relevant carrier and/or delivery service(s).

As illustrative, but non-limiting, examples, exemplary service-related changes and/or upgrade instructions for a particular mail piece may comprise, for example: an instruction to change the carrier (with an identification of the new Carrier); an instruction to upgrade the delivery service (e.g., upgrade from First Class USPS Mail to Express Mail) for a particular mail piece (sometimes referred to herein as an Exemplary Delivery Service Upgrade Intercept Instruction); an instruction to insure a particular mail piece, or to upgrade existing insurance for a particular mail piece (e.g., from a previously-paid-for level of insurance, to a higher monetary amount of insurance) (sometimes referred to herein as an Exemplary Insurance Service Upgrade Intercept Instruction); an instruction to add (or cancel/remove) a Return Request receipt; an instruction to deliver a previously-uncertified mail piece with Certified Mail; and the like.

In the exemplary embodiment, an exemplary interception/rescue request for a particular mail piece may comprise a combination of exemplary physical intercept/rescue instructions and/or exemplary service-related changes and/or upgrade instructions. For example, an exemplary interception/rescue request could comprise a combination of an Exemplary Return Intercept Instruction, an Exemplary Delivery Service Upgrade Intercept Instruction for the return shipment, and an Exemplary Insurance Service Upgrade Intercept Instruction for the return shipment.

Exemplary Intercept/Rescue Instruction User Interface.

The exemplary embodiment would provide, as described further below, an exemplary user interface, an exemplary depiction of which is provided in FIG. 4, for user indication of Mail Piece Intercept/Rescue Requests and Instructions.

The exemplary embodiment would provide a user multiple ways to navigate to the exemplary Mail Piece Intercept/Rescue Requests and Instructions interface (screen/page). For example, with reference to FIG. 2, if a user indicated either an Intercept option 225 or a Rescue option 245 on the user's exemplary Shipping History interface (screen/page) for a particular mail piece, the exemplary would navigate to an exemplary version of the exemplary Mail Piece Intercept/Rescue Requests and Instructions interface (screen/page) depicted in FIG. 4; the exemplary embodiment would pre-populate information in the identification fields for the relevant mail piece according to the user's selection from the user's exemplary Shipping History interface (screen/page) as depicted in FIG. 2.

A user might choose to intercept a mail piece for the user's own reasons, such as, for example, to redirect a mail piece to a new location after discovering a change of location for the directed recipient, or, as an additional example, to upgrade the delivery service level for a mail piece to expedite the delivery schedule.

Alternatively, a user could navigate to the exemplary Mail Piece Intercept/Rescue Requests and Instructions interface (screen/page) as a result of receiving a Rescue alert email or text message, or from a link provided in such a Rescue alert email or text message, such as by clicking the exemplary link provided in such a Rescue alert message.

Figure 5:
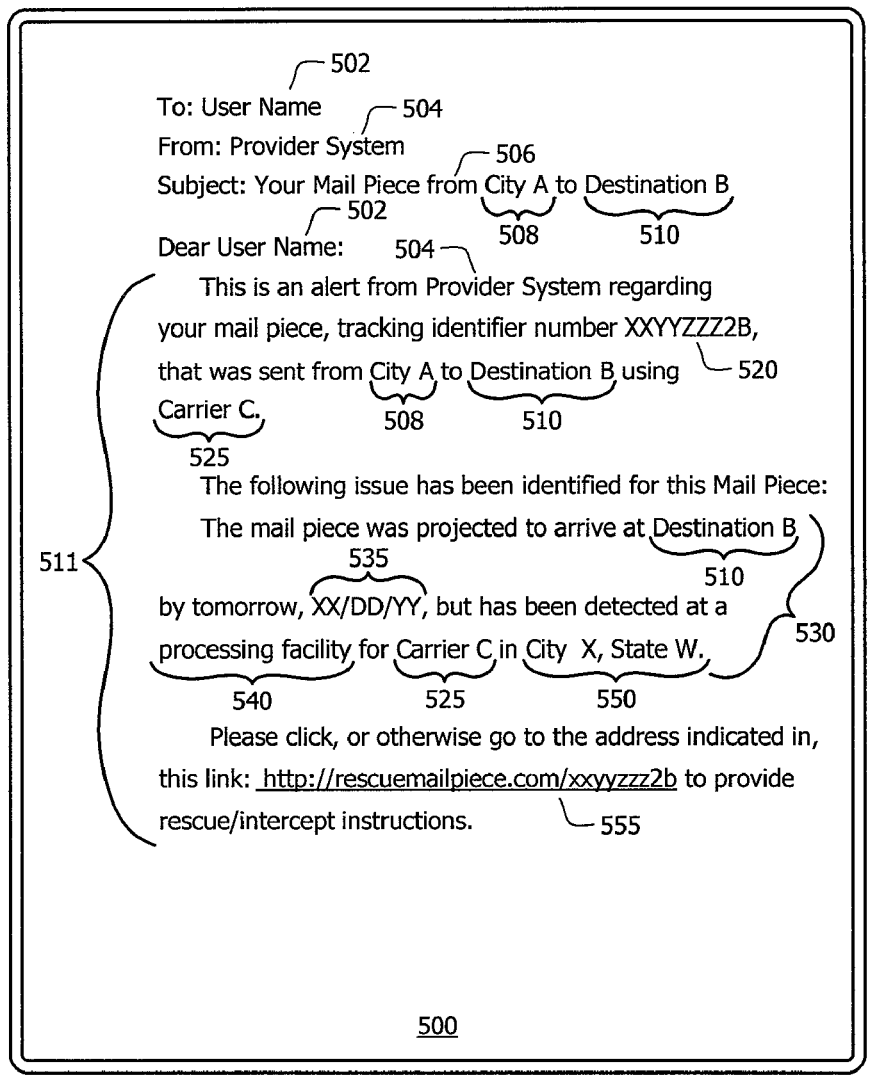
FIG. 5 is an illustrative graphic depiction of an exemplary email Rescue alert message in an exemplary embodiment of the present invention.

An exemplary email Rescue alert message 500 is illustratively depicted in FIG. 5. As depicted in FIG. 5, an exemplary email Rescue alert message 500 would be sent by, for example, the exemplary Provider System 50 to an authorized user 502 (e.g., a sending user) or party. The exemplary message 500 would comprise a summary subject line 506. In the exemplary email Rescue alert message 500 depicted in FIG. 5, the exemplary summary subject line 506 comprises an exemplary summary identification of a Mail Piece by indicating the Origin (Origin A) 508 and the Destination (Destination B) 510 for the exemplary mail piece.

The exemplary body 511 of exemplary message 500 would comprise further exemplary identification of the mail piece (e.g., an exemplary tracking identifier number 520, the Origin (Origin A) 508, the Destination (Destination B) 510, and the Carrier (Carrier C) 525. The exemplary body 511 of exemplary message 500 would further comprise an exemplary summary description 530 of the relevant Alert issue. The exemplary summary description 530 illustratively depicted in FIG. 5 indicates that the mail piece was projected to arrive at a particular destination (Destination B) 510 by a projected date (XX/DD/YY) 535, but has been detected at another location (a processing facility 540 for Carrier C 525 in City X, State W 550). The exemplary body 511 of exemplary message 500 would further comprise an exemplary link 555 that would comprise a hypertext link to an Internet address that the user could either click, or copy into the user's browser, to navigate to the relevant internet address to access an exemplary intercept/rescue user interface, such as is illustratively depicted in FIG. 4, to indicate the user's rescue instructions.

Figure 4:
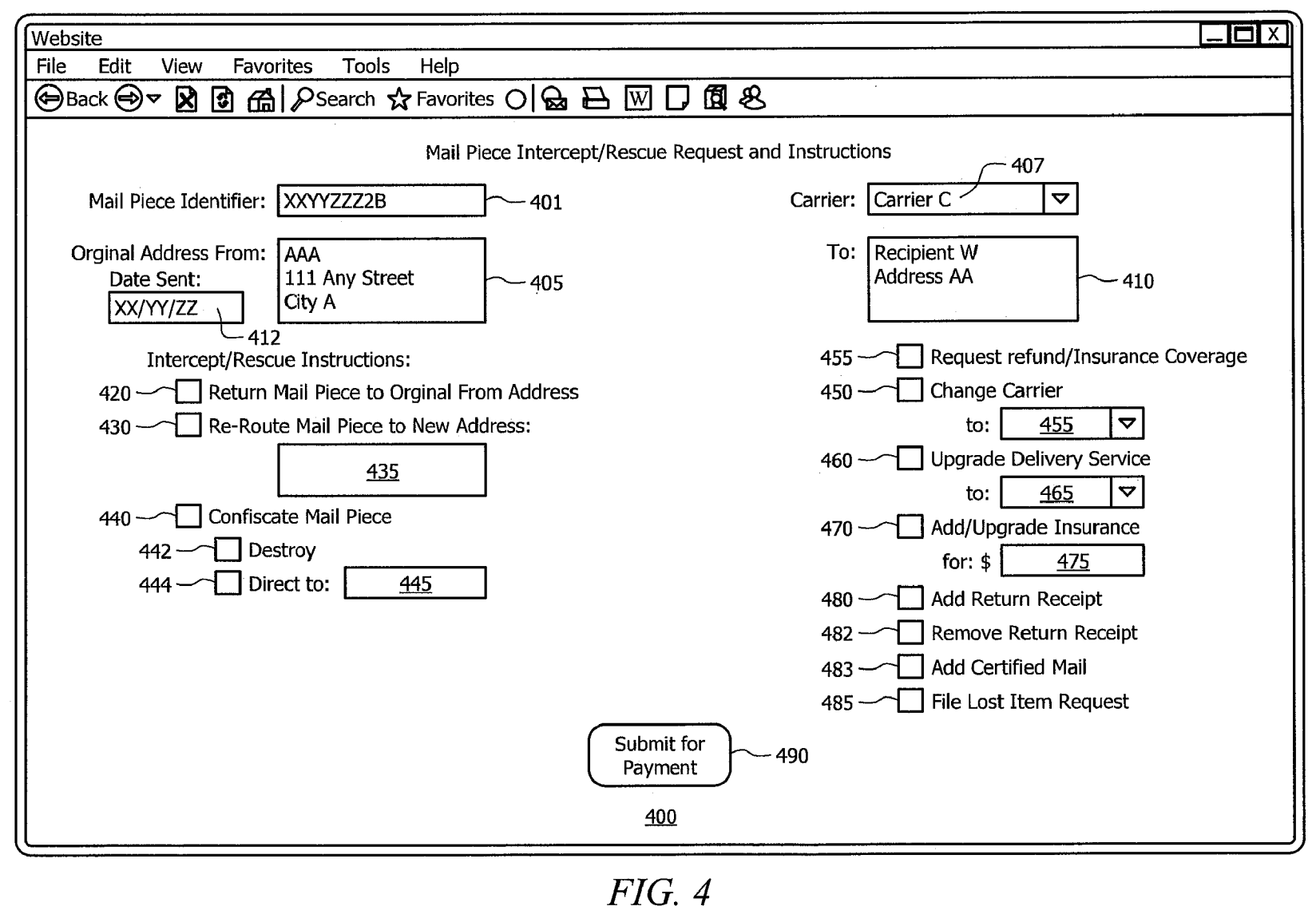

As an alternative to clicking the exemplary link 555 or copying that link into the user's browser, the user could instead respond to receipt of an exemplary Rescue alert message by accessing the user's Shipping History with the exemplary Service provider, as illustratively depicted in FIG. 2, locate the relevant mail piece and indicate either the relevant Intercept option 225 or the relevant Rescue option 245 for the corresponding mail piece; doing so would cause the exemplary embodiment to navigate to an exemplary intercept/rescue user interface such as is illustratively depicted in FIG. 4. In the exemplary embodiment, if the user chose to do nothing after receiving a Rescue alert message, processing of the mail piece would continue by the Carrier without interception or rescue instructions from the user.

As further described below, the exemplary embodiment would analyze a user's indication of intercept/rescue instructions and would notify the user if any incompatible or unprocessable instructions had been indicated.

Returning with reference to FIG. 4, an exemplary Mail Piece Intercept/Rescue Request and Instruction interface 400 would provide input fields for identifying the mail piece, such as an exemplary Mail Piece Identifier input field 401; an exemplary Carrier input field 407 (which could comprise a pull-down menu of supported carriers), an Original Address From input field 405, an Original Address To input field 410, and a Date Sent input field 412. As mentioned above, if a user navigated to the exemplary Mail Piece Intercept/Rescue Request and Instruction interface 400 from, for example, the user's Shipping History, or from an exemplary Rescue alert message, the exemplary mail piece identification input fields would be pre-populated with identifying information for the particular mail piece indicated by the user on the user's Shipping History interface (see, e.g., FIG. 2) or indicated in the relevant Rescue Alert message (see, e.g., FIG. 5).

Returning with reference to FIG. 4, an exemplary Mail Piece Intercept/Rescue Request and Instruction interface 400 would further provide input fields for user intercept/rescue instructions, such as, for example: an instruction indicator to return the particular mail piece to the sending user's return address 420 (sometimes referred to herein as an Exemplary Return Intercept Instruction; or an instruction indicator to re-route the particular mail piece to a new destination address 430, with an identification of the new destination address 435 (sometimes referred to herein as an Exemplary Re-Routing Intercept Instruction); or an instruction indicator to confiscate the particular mail piece 440 with an indicator to destroy 442 the mail piece, or an indicator to direct delivery of the mail piece 444 and an identification 445 of the party and/or the party's address to which the mail piece should be directed.

As mentioned above, and as further described elsewhere herein, when such a confiscate instruction (whether destroy or redirect) is provided to a carrier, the exemplary confiscate instruction would provide an identification of the intercept requesting party and an authorization for the intercept requesting party to issue a confiscation request; such identification and authorization information would be provided from the Service provider memory for the particular user accessing the Mail Piece and Intercept/Rescue Request and Instructions interface and would not be entered in that particular interface screen/page. That is, a user would need to have registered with the relevant Service provider before the user would be allowed to access the Mail Piece and Intercept/Rescue Request and Instructions interface; the exemplary embodiment would validate a user's identification, registration and authorization to enter an Intercept/Recue instruction for a particular mail piece.

Exemplary embodiment user verification for issuing interception and/or rescue instructions would be done, for example, as follows: any sending user would be allowed to issue intercept/rescue instructions for a mail piece for which the user had used the Service provider to generate shipping and tracking indicia for that mail piece. If a user is determined to be a party other than the sending user, then the exemplary embodiment would determine whether the sending user had identified the subject user as an authorized user (e.g., element number 187 in FIGS. 1 and 2) when indicating Intercept Tracking and/or Rescue Alerts, and if so, the subject user would be allowed to indicate intercept/rescue instructions for the relevant mail piece. Otherwise, the exemplary embodiment would determine whether or not the subject user has governmental or service provider authority (which would be a status associated with certain limited users by an administrator for the relevant Service provider upon that user's registration (not shown)).

Continuing with reference to FIG. 4, an exemplary Mail Piece Intercept/Rescue Request and Instruction interface 400 would further provide input fields for user indication of exemplary service-related changes and/or upgrade instructions for a particular mail piece, such as, for example: an exemplary instruction indicator to change the carrier 450 (with an identification of the new Carrier 455, such as may be designated with an exemplary pull-down menu of supported carriers); an instruction to upgrade the delivery service 460 and an identification of the upgraded delivery service 465 (e.g., for upgrading from First Class USPS Mail to Express Mail) for a particular mail piece (sometimes referred to herein as an Exemplary Delivery Service Upgrade Intercept Instruction); an instruction to insure a particular mail piece, or to upgrade existing insurance 470 for a particular mail piece and an insured amount 475 (e.g., from a previously-paid-for level of insurance, to a higher monetary amount of insurance) (sometimes referred to herein as an Exemplary Insurance Service Upgrade Intercept Instruction); an instruction to add 480 (or cancel/remove 482 a Return Request receipt; an instruction to deliver a previously-uncertified mail piece with Certified Mail 483; and the like.

Continuing with reference to FIG. 4, an exemplary Mail Piece Intercept/Rescue Request and Instruction interface 400 would further provide input fields for user indication of exemplary loss resolution instructions, such as to request a refund and/or insurance coverage 455, and/or to automatically file a Lost Item Request 485 with the relevant carrier.

Further, the exemplary embodiment, would, for example, provide automatic interaction between the relevant user(s) and, for example, automated carrier issue resolution services for the relevant carrier (such as, with, e.g., the USPS's Business Service Network eService), to request refunds for postage or shipping fees and or insurance coverage for lost items. For example, if the user input an indicator for the exemplary Request Refund/Insurance Coverage option 455, the exemplary embodiment would automatically electronic file an electronic request for a refund for postage and/or insurance coverage for the missing item from the relevant carrier (e.g., for the USPS, from the USPS Business Network Support System eService). Once the user had completed and authorized the electronic filing request by checking the exemplary Request Refund/Insurance Coverage option 455, the exemplary embodiment would automatically pre-populate fields in the electronic filing postage refund/insurance coverage request with data regarding the item sent and information regarding the absence of actual tracking events for the item and would electronically "file" the request with the relevant carrier/system/carrier API (Application Program Interface).

Further, in some exemplary embodiments, after the electronic "filing" of such a refund or lost-item request, the exemplary embodiment would issue follow-up status checks both for the item and for the lost-item request; would provide follow-up information to the relevant carrier system regarding the absence, and timing of the absence, of actual tracking events for the item; and would notify the requesting user when a carrier-resolution of the matter is received.

As previously mentioned above, in the exemplary embodiment, an exemplary interception request for a particular mail piece may comprise a combination of exemplary physical intercept instructions and/or exemplary service-related changes and/or upgrade instructions. For example, an exemplary interception request could comprise a combination of an Exemplary Return Intercept Instruction, an Exemplary Delivery Service Upgrade Intercept Instruction for the return shipment, and an Exemplary Insurance Service Upgrade Intercept Instruction for the return shipment. The exemplary embodiment would validate the user's input and would alert the user of any incompatibilities or unprocessable combinations of instructions. For example, the exemplary embodiment would not allow a user to indicate both Return (420) of a mail piece and Re-Routing (430) of a mail piece. As another example, the exemplary embodiment would not allow a user to indicate both Return (420) of a mail piece and Confiscate (440). As yet another example, the exemplary embodiment would not allow a user to indicate both Add Return Receipt (480) and Remove Return Receipt (482). As yet a further example, the exemplary embodiment would not allow a user to indicate a Delivery Service 465 that would not be provided by the relevant carrier.

Once a user had entered valid Intercept/Rescue instructions, the user would click, or otherwise activate, the exemplary Submit for Payment button 490, which would cause the exemplary embodiment to display a payment window (not shown, but with input fields similar to those shown in the exemplary payment window 270 depicted in FIG. 2). The exemplary payment window would display a total charge for the various intercept/rescue instructions and service changes and upgrades and would provide for input of payment account and related information.

Exemplary Manifest Intercept/Rescue Instruction User Interface.

As previously mentioned herein, the exemplary embodiment would facilitate a user issuing exemplary manifest intercept/rescue requests and instructions. For example, in the exemplary embodiment, if the user indicated the Intercept option 225 and/or the Rescue option 245 for more than one item in the user's Shipping History, for each item so indicated that would be sent using the same carrier, the exemplary embodiment would provide an exemplary Manifest Intercept/Rescue Request and Instruction interface as illustratively depicted in FIG. 6 with a listing 620 of multiple mail pieces.

The exemplary Manifest Intercept/Rescue Request and Instruction interface as illustratively depicted in FIG. 6, is similar to the exemplary Mail Piece Intercept/Rescue Request and Instruction interface illustratively depicted in FIG. 4, except that instead of a single mail piece, the same intercept/rescue instructions (e.g., Return 420; Re-Route 430/435; Confiscate 440 (Destroy 442 or Direct 444); Change Carrier 450/455; Upgrade Delivery Service 460/465; Add/Upgrade Insurance 470/475; Add Return Receipt 480; Remove Return Receipt 482; Add Certified Mail 483) may be input for multiple mail pieces (as depicted in the exemplary manifest listing 620.

An exemplary manifest listing 620 could be created in the exemplary embodiment by, as mentioned above, a user indicating the Intercept option 225 and/or the Rescue option 245 for more than one item in the user's Shipping History, where each item so indicated would be sent using the same carrier. Alternatively, a user could navigate to the exemplary Manifest Intercept/Rescue Request and Instructions interface (screen/page) and enter a particular carrier 607 and/or a Date Sent 612. Entering an exemplary carrier 607 and/or a Date Sent 612 would cause the exemplary embodiment to list the mail pieces for which the exemplary embodiment had been used to create shipping and tracking indicia as depicted in the exemplary manifest listing 620. The exemplary embodiment would allow the user to edit the exemplary manifest listing 620, such as, by placing the user's cursor over a particular mail piece in the listing 620 and, for example, right clicking and then selecting a delete option, which would cause the deletion from the listing 620 of the relevant highlighted mail piece. Once the user had created a manifest listing 620 of mail pieces and had input a valid selection of instructions and related information, the user would be prompted to click, or otherwise activate, the exemplary Submit for Payment online button 490, in order to pay for the requested services and instructions.

Exemplary Generation and Communication of Exemplary Intercept/Rescue Notifications.

Figure 7:
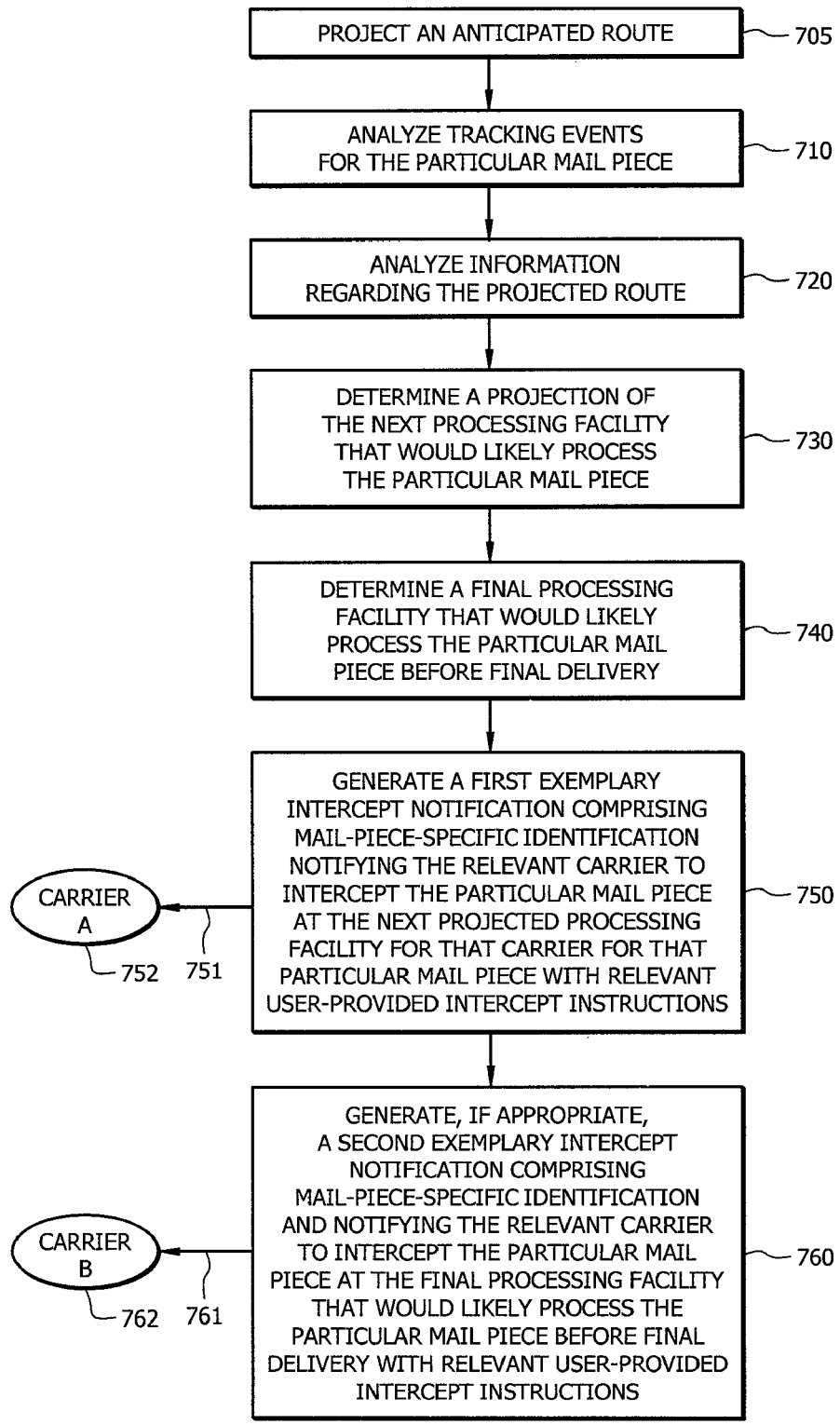
FIG. 7 comprises an illustrative depiction of exemplary high-level logic functions that would be performed in an exemplary embodiment of the present invention to process an intercept/rescue request from a user and provide relevant intercept/rescue notifications to the relevant carrier(s)

FIG. 7 comprises an illustrative depiction of exemplary high-level logic functions that would be performed in an exemplary embodiment to process an intercept/rescue request from a user and provide relevant intercept/rescue notifications (sometimes referred to herein simply as intercept notifications) to the relevant carrier(s). In response to receiving an intercept/rescue request for a particular mail piece, as illustratively depicted in FIG. 7, an exemplary embodiment would: project 705 an anticipated route (as described further herein) for the relevant mail piece; analyze 710 tracking events (such as, e.g., carrier scan events) for the particular mail piece (as described further herein); analyze 720 information regarding the projected route (as described further herein); determine 730 a projection of the next processing facility that would likely process the particular mail piece. As will be understood by someone with ordinary skill in the art, depending on the circumstances for a particular mail piece, the above-mentioned "next" processing facility, depending on a timing by the user's intercept/rescue request, may comprise the same processing facility at which the most recent tracking event was recorded.

Continuing with reference to FIG. 7, the exemplary embodiment would determine 740 a final processing facility that would likely process the particular mail piece before final delivery; generate 750 a first exemplary intercept(/rescue) notification comprising mail-piece-specific identification notifying the relevant carrier to intercept the particular mail piece at the next projected processing facility for that carrier for that particular mail piece with relevant user-provided intercept instructions, and communicate 751 the first exemplary intercept notification to the relevant carrier (e.g., a first carrier, Carrier A) 752; and generate 760, if appropriate, a second exemplary intercept(/rescue) notification comprising mail-piece-specific identification and notifying the relevant carrier to intercept the particular mail piece at the final processing facility that would likely process the particular mail piece before final delivery, with relevant user-provided intercept instructions, and communicate 761 the second exemplary intercept notification to the relevant carrier (e.g., a second carrier, Carrier B) 762. As mentioned elsewhere herein, exemplary intercept/rescue notifications would comprise, among other things, an identification of the piece (e.g., with a tracking number, barcode or other piece-specific identifying information. Carriers A 752 and B 762 may be the same carrier.

However, the exemplary embodiment would support route projection, tracking, identifying and providing rescue alerts, and generating and communication of intercept/rescue notifications for multi-carrier shipments. That is, as described in the Parent application (U.S. patent application Ser. No. 13/705,935, titled "VISUAL GRAPHIC TRACKING OF ITEM SHIPMENT AND DELIVERY", filed on Dec. 5, 2012; the entire disclosure and contents of which have previously above been incorporated herein in full by reference as if stated in full herein), a user could choose to use more than one carrier to deliver a mail piece from an origin location to a destination location. Therefore, it would be possible that in determining a "next" processing facility (as described above with respect to element 730 in FIG. 7) and a "final" processing facility (as described above with respect to element 740 in FIG. 7), if a user had chosen to use more than one carrier to ship a mail item, the generate 750 and communicate 751 processes may be done with respect to one carrier (e.g., Carrier A 752); whereas the generate 760 ad communicate 761 processes for a final processing facility could be done with respect to a second carrier (e.g., Carrier B 762).

Exemplary Route and Schedule Variation Identification.

Exemplary embodiments would provide the intercept and rescue alerts and services described herein by first projecting routes for each relevant mail piece, and by then tracking the relevant mail pieces and monitoring information related to the relevant projected routes. Intercept and/or rescue alerts and related services could be done for a particular piece upon request (and, e.g., for an additional price), or as a matter of course for each piece (e.g., as a value-added service).

Figure 8:
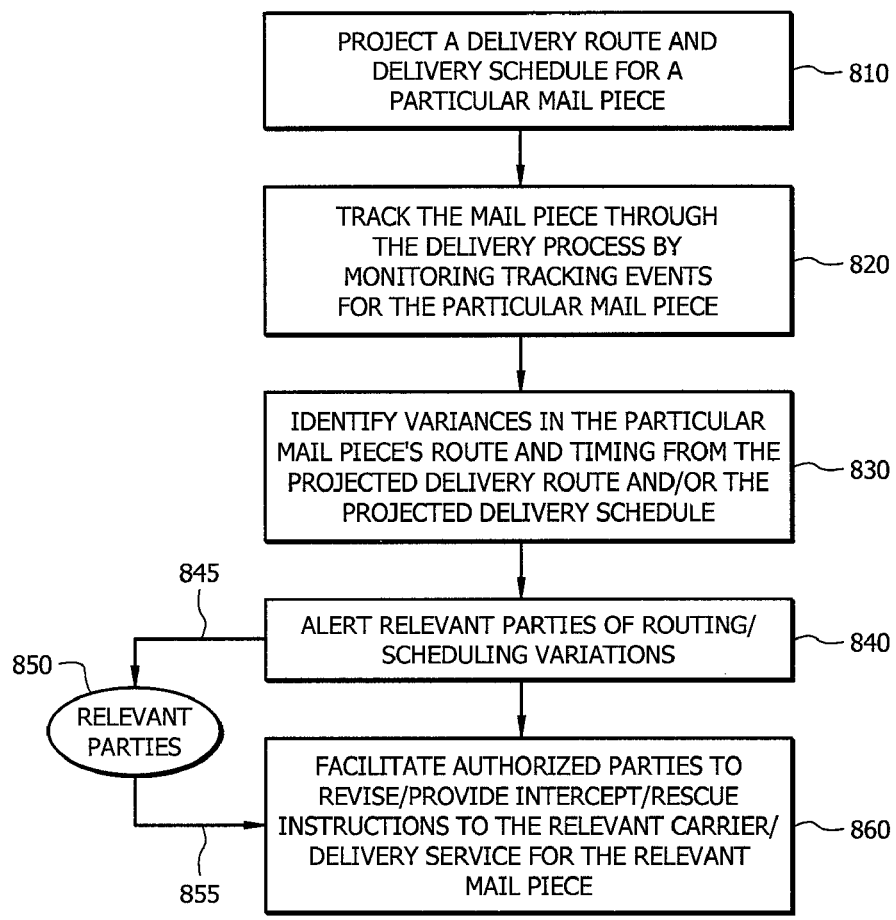
FIG. 8 comprises an illustrative depiction of exemplary high-level logic functions that would be performed in an exemplary embodiment of the present invention to provide alerts to users.

FIG. 8 comprises an illustrative depiction of exemplary high-level logic functions that would be performed in an exemplary embodiment to provide alerts to users. As illustratively depicted in FIG. 8, an exemplary embodiment (either upon request, or for all pieces, as the case may be): would project 810 a delivery route and delivery schedule for a particular mail piece sent/to be sent from a particular origin/origin address to a particular destination/destination address using a particular carrier (or set of carriers), using a particular delivery service (or set of delivery services) (e.g., priority level); would track 820 (as described in more detail elsewhere herein) the mail piece through the delivery process by monitoring tracking (e.g., scanning) events for the particular mail piece; would identify 830 variances in the particular mail piece's route and timing from the projected delivery route and/or the projected delivery schedule, e.g., by comparing the scanning events encountered for the particular mail piece to the projected route and projected delivery schedule. If the exemplary embodiment determines that the mail piece is substantially proceeding along the projected route, substantially according to the projected delivery schedule, then there would be no "variations" to report. However, to the extent to which variations are identified, the exemplary embodiment would alert 840/845 relevant parties 850 (e.g., sender/shipper/seller, recipient/buyer, insurer, the relevant carrier, or other authorized parties) of routing/scheduling variations; and would facilitate 860 authorized parties to revise/provide 855 intercept/rescue instructions to the relevant carrier/delivery service for the relevant mail piece.

Once intercept/rescue instructions have been received from a user, the exemplary embodiment would then determine the carrier/processing facility to notify as described (e.g., with respect to FIG. 7) elsewhere herein.

Exemplary Route and Schedule Projection.

The exemplary embodiment would determine a projected delivery route and a projected delivery schedule for a piece sent/to be sent from a particular origin/origin address to a particular destination/destination address. In the exemplary embodiment, exemplary delivery schedules for delivering a particular piece would be projected according to carrier-specific, delivery-service-specific rules, according to the origin location/address/postal code, the delivery location/address/postal code, shipping/mailing date (and relevant projected pickup date/time), and specifications (e.g., weight, size, etc.) for the particular piece. For example, a carrier may provide a carrier-specific database identifying carrier-specific mail piece hubs and processing facilities, exemplary transport methods, and exemplary carrier-specific rules for projecting routes, and delivery dates and times.

In some exemplary embodiments, instead of projecting a route beginning with the origin address or a return address, projection of a route would be done based, for example, on a first tracking (e.g., scan) event at an origin location, such as a carrier pick-up location, for the mail piece; and then the route would be projected to the destination for that mail piece from that origin (e.g., pickup) location.

Exemplary carrier-specific processing facilities may comprise, for example, airport hubs, or other mail piece processing facilities. Exemplary carrier-specific transport methods may comprise, for example, trucks, trains, air transport, sea transport, or other types of transport methods. Information and rules for projecting the route(s), the transport method(s), the location(s) and type(s) of processing facilities, as well as for projecting delivery dates and times and rates, would be determined according to information obtained from exemplary Carrier Information/Rules data bases, if such Carrier Information/Rules data bases are available and accessible by the exemplary embodiment.

If such Carrier Information/Rules data bases are not available and accessible by the exemplary embodiment, the exemplary embodiment would develop a database of carrier-specific hubs and processing facilities, and routes, for a particular carrier, and a particular delivery service provided by that carrier, using scan results of a plurality of previously sent pieces with scanning/tracking history. The exemplary embodiment would account for different routes and schedules according to differences between delivery services for that carrier. For example, a carrier may use different routes for one delivery service as compared to another delivery service, in order to deliver pieces from a particular origin postal code to a particular destination postal code. For example, a carrier might use a first route through a first set of processing facilities to deliver high-priority delivery service pieces; the same carrier might use a second route through a second set of processing facilities to delivery lower-priority delivery service pieces.

On alternative exemplary embodiments, all pieces delivered by the same carrier would be analyzed, regardless of the delivery services that had been used to deliver those pieces, in order to determine a carrier-specific projected delivery route for delivering a particular mail piece.

If the above-mentioned Carrier Information/Rules data bases are not available and accessible by the exemplary embodiment, or are not available for a particular carrier and/or delivery service, in order to project a carrier-specific, delivery-service-specific route and delivery schedule for a particular mail piece to be delivered from a particular origin/address/postal code to a destination/address/postal code, the exemplary embodiment would analyze tracking (e.g., scanning event) history information for each mail piece sent by the particular carrier using the particular delivery service.

Figure 9:
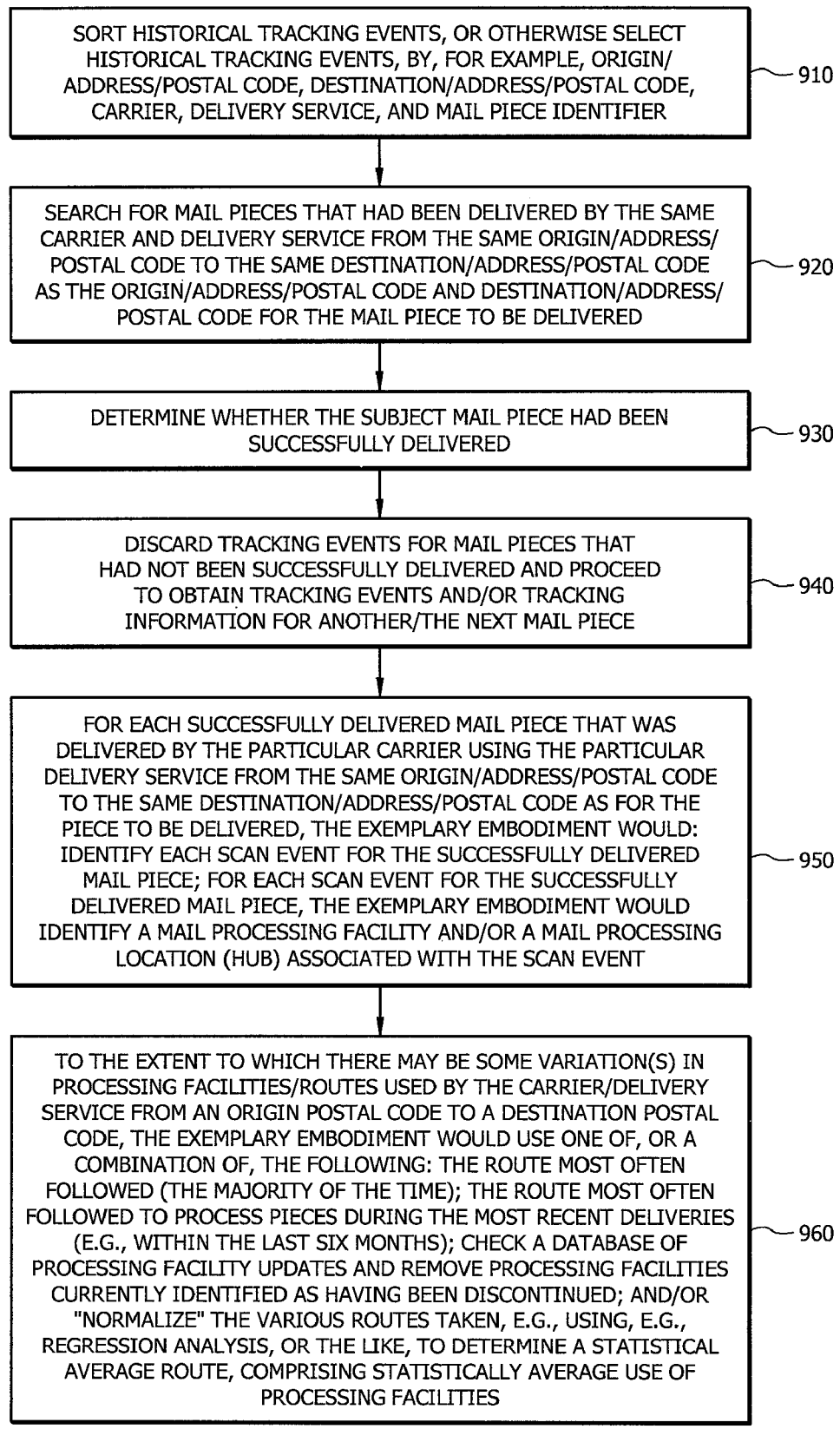
FIG. 9 comprises an illustrative depiction of exemplary high-level logic functions that would be performed in an exemplary embodiment of the present invention to project a carrier-specific, delivery-service-specific route and delivery schedule for a particular mail piece to be delivered from a particular origin/address/postal code to a destination/address/postal code.

FIG. 9 comprises an illustrative depiction of exemplary high-level logic functions that would be performed in an exemplary embodiment to project a carrier-specific, delivery-service-specific route and delivery schedule for a particular mail piece to be delivered from a particular origin/address/postal code to a destination/address/postal code. As illustratively depicted in FIG. 9, for each mail piece for which a route and schedule are to be projected, the exemplary embodiment would sort 910 historical tracking events, or otherwise select historical tracking events, by, for example, origin/address/postal code, destination/address/postal code, carrier, delivery service, and mail piece identifier.

Continuing with reference to FIG. 9, the exemplary embodiment would search 920 for mail pieces that had been delivered by the same carrier and delivery service from the same origin/address/postal code to the same destination/address/postal code as the origin/address/postal code and destination/address/postal code for the mail piece to be delivered. The exemplary embodiment would search in this way, proceeding with the approach that although there may be a plurality of potential pickup locations within a particular origin postal code, and although there may be a plurality of possible destination locations within a particular destination postal code, a carrier's delivery route from an origin postal code to a destination postal code may likely be the same, or similar, regardless of variation of a particular pickup location within the origin postal code and a particular delivery address within the destination postal code.

Continuing with reference to FIG. 9, for pieces with the same origin/address/postal code and destination/address/postal code, the exemplary embodiment would determine 930 whether the subject mail piece had been successfully delivered. If the subject tracking events for a mail piece indicated that the subject mail piece had not been successfully delivered, then the exemplary embodiment would discard 940 tracking events for mail pieces that had not been successfully delivered, and would proceed to obtain tracking events and/or tracking information for another/the next mail piece.

Continuing with reference to FIG. 9, as depicted in exemplary process 950, for each successfully delivered mail piece that was delivered by the particular carrier using the particular delivery service from the same origin/address/postal code to the same destination/address/postal code as for the piece to be delivered, the exemplary embodiment would: Identify each scan event for the successfully delivered mail piece; for each scan event for the successfully delivered mail piece, the exemplary embodiment would identify a mail processing facility and/or a mail processing location (hub) associated with the scan event.

As will be understood by someone with ordinary skill in the art, delivery scan events may happen at a delivery address; pickup scan events may happen at an origin pickup location; other scan events may happen at particular processing facilities for the relevant carrier.

Continuing with reference to FIG. 9, as depicted in exemplary process 960, to the extent to which there may be some variation(s) in processing facilities/routes used by the carrier/delivery service from an origin postal code to a destination postal code, the exemplary embodiment would use one of, or a combination of, the following: the route most often followed (the majority of the time); the route most often followed to process pieces during the most recent deliveries (e.g., within the last six months); check a database of processing facility updates and remove processing facilities currently identified as having been discontinued; and/or "normalize" the various routes taken, e.g., using, e.g., regression analysis, or the like, to determine a statistical average route, comprising statistically average use of processing facilities.

Exemplary Tracking and Reporting.

As previously mentioned herein, exemplary tracking of a mail piece (sometimes referred to herein simply as a "piece") would involve a mail-piece-specific tracking identifier being physically associated with the piece. That is, some identifier, whether an alphanumeric identifier, a machine-readable graphic symbology (e.g., a barcode, a computer-generated indicia, or the like), a micro-ID-chip, a GPS-enabled ID chip, an RFID, or some other device, code or the like, that would be substantially unique, or unique, such as during a particular period of time, that would serve to identify the particular mail piece, such as during a particular period of time.

Exemplary tracking of a mail piece would further involve the relevant carrier/delivery service recording (e.g., electronically, or digitally, recording) tracking events, such as scanning a tracking identifier, or machine-sensing a machine-sensable identifier; the relevant carrier would record each tracking event on a computer device accessible by the exemplary embodiment, such as on a carrier-specific server computer device, or on a common carrier server computer device, or the like, accessible, for example, through the Internet, or on a file that the relevant carrier would electronically send, or otherwise direct to, the relevant Service provider system.

Figure 3:
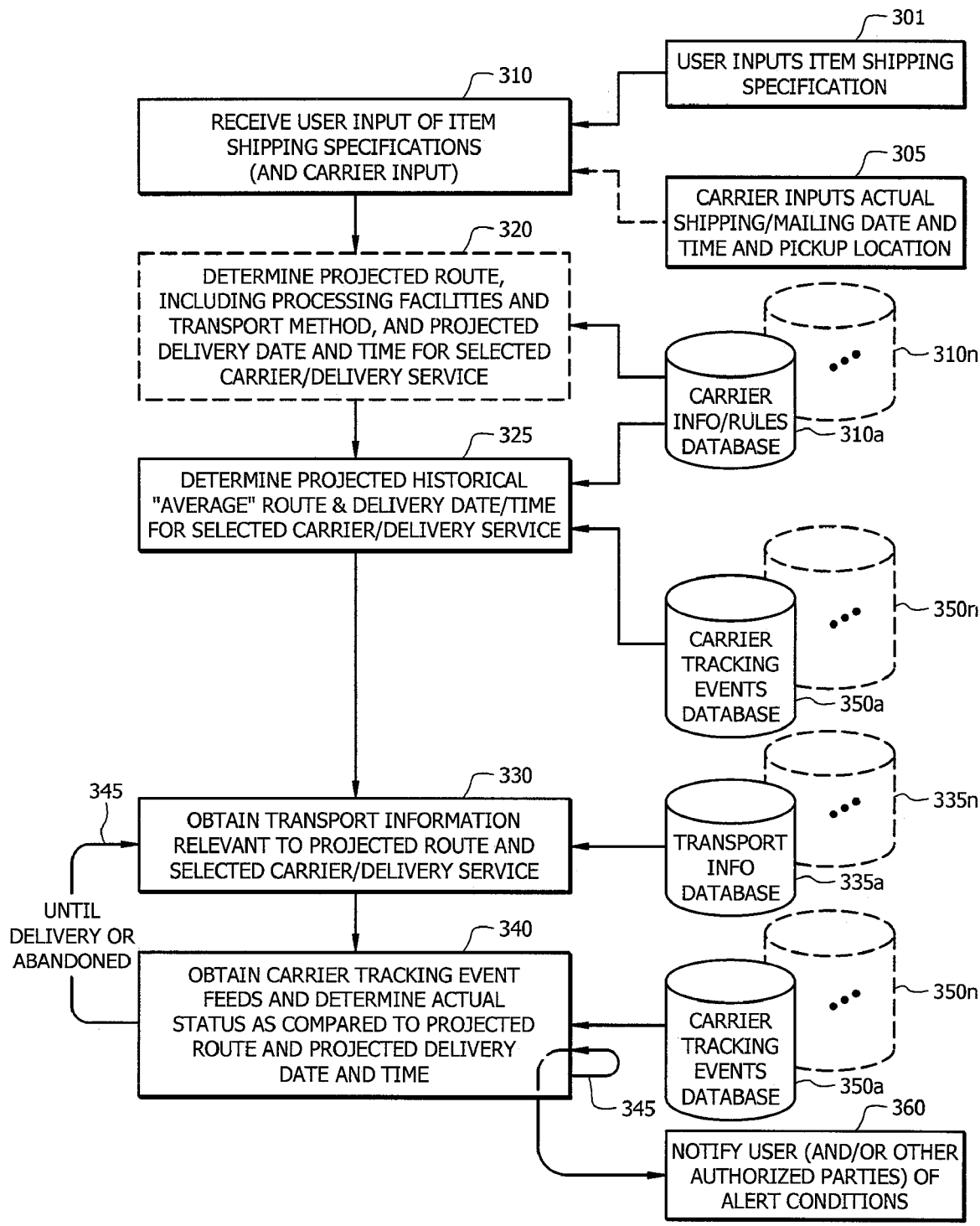
FIG. 3 comprises an illustrative depiction of exemplary high-level logic functions that would be performed in an exemplary embodiment of the present invention to monitor en route tracking events and provide intercept tracking and rescue alerts to users.

FIG. 3 comprises an illustrative depiction of exemplary high-level logic functions that would be performed in an exemplary embodiment to monitor en route tracking events and provide intercept tracking and rescue alerts to users. As illustratively depicted in FIG. 3, the exemplary embodiment would receive 310 user input 301 of item shipping specifications (and carrier input 305, as appropriate). The exemplary embodiment would determine 320 a projected route and schedule for delivery of the mail piece (as described in more detail elsewhere herein) using carrier information and rules databases (e.g., 310a . . . 310n) if available. If such carrier data bases were not available, or do not provide information sufficient to determine a projected route and schedule, then the exemplary embodiment would determine 325 a projected route and schedule based on historical carrier tracking events (e.g., using carrier tracking events databases 350a . . . 350n) as further described elsewhere herein).

The exemplary embodiment would then monitor 345 (until determining that the mail piece has either been delivered or abandoned) server computer devices (e.g., Transport information databases 335a . . . 335n), such as through, for example, the Internet, and/or various media, and/or would receive files, in order to obtain 330 transport information relevant to the projected route and the relevant carrier and delivery service; the exemplary embodiment would obtain 340 carrier-recorded tracking events (such as, for example, from exemplary carrier tracking events databases 350a . . . 350n) for relevant pieces (relevant to the exemplary embodiment, whether for particular pieces for which intercept tracking and/or rescue alerts has/have been requested by a user, or as a matter of course for each mail piece for which the exemplary embodiment has been used to facilitate production of carrier-specific shipping/postage indicia).

Continuing with reference to FIG. 3, the exemplary embodiment would compare (see element 340) tracking events received, and the absence of tracking events, as the case may be, to the projected route and delivery schedule for the particular mail piece; as mentioned elsewhere herein, the exemplary embodiment would notify 360 the relevant user of variances between the projected route and projected delivery schedule as compared to actual tracking events and/or the absence of tracking events for mail pieces for which intercept tracking for a particular mail piece.

The exemplary embodiment would monitor tracking events for a particular mail piece and determine if no tracking event data is received for the particular mail piece within a certain amount of time (such as a pre-established interval of time). In the exemplary embodiment, the amount of time that would elapse before triggering a proactive package loss prevention/issue alert could vary, e.g., based on the particular carrier and delivery service, and as a function of time from package drop-off and/or pickup.

For mail pieces for which intercept tracking and/or rescue alerts had been requested, or are to otherwise be provided, if the exemplary embodiment should determine that the relevant alert interval of time has passed and no tracking event has been received or otherwise detected for that mail piece, the exemplary embodiment would provide the user rescue alerts and would facilitate user-interactivity in order to provide intercept/rescue instructions (as described elsewhere herein) that the exemplary embodiment would automatically communicate to relevant carrier (e.g., to arrange for a replacement delivery, refunds, and/or other appropriate actions).

For example, for a particular mail piece that had been sent using, for example, First Class Mail® by the United States Postal Service, if a scan event had not been received, as an illustrative, non-limiting example, within, e.g., eighteen (18) hours from the sending user's indication of a drop-off, the exemplary embodiment would alert, for example, both the sending user and, if the sending user had authorized the receiving user, the receiving user; the exemplary embodiment and would provide an interactive graphic user interface that would facilitate, for example, a request by the sending user to return the original mail piece to the sending user's return address, so that the sending user could send a replacement item using a higher-priority delivery service, e.g., Express Mail.

Reference herein to a sending user will be understood to mean a shipping user, and vice versa.

Alternatively, or in addition to alerting a sending user, the exemplary embodiment, could, if authorized by the sending user to alert the recipient, report the alert to the recipient; doing so would allow the recipient to arrange for a replacement item. For example, if an ordering user had ordered from a product supplier, a part that was needed for a project, the ordering user, upon receiving an alert as described above, could contact the product supplier and request that a replacement part be shipped to the ordering user using, for example, a higher-priority delivery service in order to prevent compromising the relevant project schedule; the receiving user could agree to pay increased shipping costs for the product supplier to ship the replacement item using a higher-priority delivery service, such as for overnight delivery.

Further, the types of variances that would be reported by the exemplary embodiment would include, as illustrative, non-limiting examples: identification of tracking events for the relevant mail piece identifying a location that was inconsistent with the projected route; identifying tracking events, the time for which were past the projected schedule for delivery; determining that a carrier-specific mail processing facility on the projected route is experiencing delay and/or other processing issues; determining that weather conditions exist on the projected route that could affect a mail piece's actual route and/or delivery schedule; determining that transport conditions exist on the projected route that could affect a mail piece's actual route and/or delivery schedule.

In some exemplary embodiments, the exemplary embodiment would automatically, or by request of a relevant carrier would, project routes and delivery schedules and would track each mail piece for which the exemplary embodiment system is used to create shipping/sending/mailing indicia; if any variations from the projected route and/or the projected schedule occurred, rather than (or in some cases, in addition to) alert the relevant sending user, the exemplary embodiment would alert the relevant carrier. The relevant carrier could then investigate the situation and determine if the variance occurred due to a carrier processing issue, or alternatively, whether the variance may be due to a variance between the indicia for the mail piece as compared to the address labeling for the particular mail piece, such as may occur in certain indicia theft cases.

Exemplary Mail Piece Confiscation Communications and Services.

As mentioned elsewhere herein, exemplary embodiments of the present invention would further provide exemplary mail piece confiscation communications and related services. Exemplary embodiments would provide exemplary mail piece confiscation communications and related services for various circumstances, such as circumstances that involve unauthorized mail piece indicia.

For example, exemplary mail piece confiscation communications and related services would be provided in the event that the mail piece indicia service provider (sometimes referred to herein as the "vendor") detected, or is otherwise informed of, fraud with respect to a user's use of the vendor's system for creation of postage indicia and/or related services. An exemplary embodiment may identify that such fraud exists, for example, when the exemplary embodiment determines that a bona fide customer's account may have been "hacked into" by an unauthorized third party (sometimes referred to herein as a "hacker"). Description herein regarding exemplary confiscation communications and services with regard to a situation where a bona fide customer's account has been "hacked into" by a hacker, may sometimes be referred to herein as a "Hacker Case."

In one type of Hacker Case, the bona fide customer is an entity that, for example, may be a processing partner (sometimes referred to herein as an exemplary "Processing Partner Entity") with the Service Provider Vendor (sometimes referred to herein as an exemplary "Processing Partner Hacker Case"). An exemplary Processing Partner Entity would have an account with the Service Provider Vendor, and would make shipping and mailing through the Service Provider Vendor available to customers of the Processing Partner Entity. That is, the customers of the Processing Partner Entity may buy or sell or trade items through a website of the exemplary Processing Partner Entity; those customers, whether or not they may separately have their own account with the Service Provider Vendor, could use the account of the exemplary Processing Partner Entity with the Service Provider Vendor with which to purchase shipping/mailing indicia for an item. In an exemplary Partner Hacker Case, someone may have hacked into either an individual customer account with the exemplary Processing Partner Entity, or may have hacked into the exemplary Processing Partner Entity's account with the exemplary Service Provider Vendor; the unauthorized hacker may have then illicitly used the relevant account to arrange for shipment (mailing) of an item (for example an item that would be shipped by the hacker, or that would be arranged by the hacker for shipment, either to the hacker, or to some other party).

If the Processing Partner Entity discovered such a hacker situation, the Processing Partner Entity would identify items (mail pieces) that had been sent by (or for which shipping (mailing) had been illicitly paid for by) the unauthorized hacker and would notify the exemplary Service Provider Vendor system of such hacked-basis shipping/mailing events.

The exemplary embodiment would provide an online exemplary user interface for exemplary Processing Partner Entities with which to notify the exemplary Service Provider Vendor system of such unauthorized hacked-based shipping/mailing events and would, as a matter of the initial registration of such a Processing Partner Entity, indicate authorization to input confiscation requests and instructions for items/mail pieces sent using the Processing Partner Entity's account. For example, an exemplary Processing Partner Entity user could use an exemplary user interface such as is illustratively depicted in FIG. 4 to notify the exemplary Service Provider Vendor system of an individual item (mail piece) that had been sent by an unauthorized hacker.

Alternatively, if the exemplary Processing Partner Entity discovered that an unauthorized hacker had used the Processing Partner Entity account (or a customer's account) to illicitly send (or pay for the sending of) multiple items (mail pieces), a Processing Partner Entity user could choose to either use an online user interface to notify the exemplary Service Provider Vendor system of the hacked cases, or could use an exemplary Application Program Interface (API) provided by the exemplary Service Provider Vendor system, with which to provide confiscation notification(s).

FIG. 6 depicts an exemplary Intercept/Rescue Request and Instruction user interface that would facilitate online input by an exemplary Processing Partner Entity user to issue a Manifest Confiscation Notification for a plurality of items (mail pieces). Using an exemplary user interface such as is illustratively depicted in FIG. 6, an exemplary Processing Partner Entity would be able to notify the exemplary Service Provider Vendor system of a listing of items (mail pieces) that had been sent by an (or by one or more) unauthorized hacker(s).

The exemplary embodiment of the present invention would, as previously mentioned, provide an exemplary Processing Partner Hacker Case API that would facilitate a notification of the exemplary Service Provider Vendor system by an exemplary Processing Partner Entity of a potentially large number of hacked-based shipped/mailed items (mail pieces). A separate drawing of the exemplary Processing Partner Hacker Case API is not depicted, but would similarly to the way in which electronic files would be produced as a result of an exemplary Processing Partner Entity user having entered an exemplary Manifest Confiscation Notification as depicted in FIG. 6.

In the exemplary embodiment, an Exemplary Processing Partner Entity's input of a Confiscation Notification (e.g., whether using the exemplary online interface as illustratively depicted in FIG. 4 for an individual item/mail piece, or the exemplary Manifest Confiscation Request as illustratively depicted in FIG. 6, or using an exemplary Processing Partner Hacker Case API) would be taken as notification that the exemplary Processing Partner Entity had obtained any and all of the necessary authorizations by any relevant customers of the exemplary Processing Partner Entity to issue such a confiscation request. In alternative exemplary embodiments, the Service Provider Vendor would separately obtain authorizations from the relevant customers to proceed with confiscation instructions to the relevant carrier(s).

As another example, exemplary mail piece confiscation communications and related services would be provided in the event that the vendor either detects, or is otherwise informed that, a user of the vendor's system is using unauthorized payment accounts (e.g., stolen credit cards, ATM accounts, debit cards, PAYPAL accounts, electronic cash accounts, or other stolen payment accounts or information) with which to pay for mail piece indicia and/or related services. Description herein regarding exemplary confiscation communications and services with regard to a situation where a user of the vendor's system is using unauthorized payment accounts may sometimes be referred to herein as a "Payment Account Theft Case" or as a "Theft Case."

As yet another example, exemplary mail piece confiscation communications and related services would be provided in the event that the vendor either detects, or is otherwise informed that, a particular mail piece (whether or not that mail piece was mailed using mail piece indicia created by the vendor's system), as identified by a mail piece identifier, such as a tracking identifier, may contain suspicious contents (sometimes referred to herein as a "Suspicious Content" case). Such a Suspicious Content case would be handled in the exemplary embodiment in a manner similar to a theft case, and will not be separately discussed in detail.

Exemplary Hacker Case Processing

For an exemplary Hacker Case, the bona fide user might identify unauthorized use of the bona fide user's account to print postage. For example, the bona fide user might review an exemplary "Postage Print" summary report and identify postage that had been printed without the bona fide user's authorization and/or knowledge. In such case, the bona fide user may notify the service provider/vendor of such unauthorized use of the bona fide user's account. Alternatively, the service provider may detect, such as through internal rules and information in the service provider's system, that a hacker has used a bona fide user's account to purchase mail piece indicia or related services.

In such case, in some embodiments, the service provider would obtain the bona fide user's permission to confiscate mail pieces that had been sent with indicia that had been created for the hacker. In some exemplary embodiments, the service provider, based on notification of a hacker case by the exemplary embodiment system, would contact the bona fide user, such as, for example, by telephone, email, text message, or other means, and request that the bona fide user provide authorization to the service provider to issue a confiscation instruction to the relevant carrier, such as, for example, to the USPS. In such an exemplary embodiment, the bona fide user may provide authorization to the service provider to issue a confiscation instruction in the form of written instructions (e.g., signed, scanned and electronically (such as by email) provided to the service provider), or by a reply email or text message, or by other communications, in forms whether now known or in the future discovered.

In other exemplary embodiments, or alternatively, the bona fide user could provide authorization to the service provider to issue a confiscation instruction by voice authorization, such as by telephone; such a voice authorization could further comprise, for example, an authorization to record the authorization.

In yet other exemplary embodiments, or alternatively, the bona fide user could provide authorization to the service provider to issue a confiscation instruction at the time that the bona fide user registered with the service provider's system. For example, when a user registers with an exemplary embodiment of the service provider's system, the exemplary embodiment system could request that the user waive any objections to, and authorize, the service provider issuing confiscation instructions to a mail piece carrier in the event that the service provider detects, or otherwise becomes aware of, a Hacker Case.

In yet other exemplary embodiments, the service provider would not be required to obtain any authorization by the relevant (bona fide) user to proceed with issuing confiscation instructions.

Once a service provider becomes aware of a Hacker Case, and once the service provider has obtained (through initial user registration or otherwise) authorization to issue confiscation instructions to the relevant carrier from the hacked bona fide user, the service provider would proceed with issuing confiscation instructions to the relevant carrier as further described below.

Alternatively, in some exemplary embodiments, it would be possible for a hacked user to issue a confiscation instruction to the relevant carrier. Such a hacked user confiscation instruction would be processed similarly to a mail item intercept instruction, but would provide an option for the hacked user to obtain a refund of any additional costs involved in processing a return or redirect instruction for the item.

Exemplary Theft Case Processing.

In an exemplary Theft Case, the relevant service provider/vendor may either detect (such as through internal investigations and/or through system processing rules and alerts (sometimes referred to herein as "internal rules"), or may otherwise be informed (from, for example, a credit, debit or ATM card/account company or other payment account provider), that, a user of the service provider's/vendor's system is using unauthorized payment accounts (e.g., stolen credit cards, ATM accounts, debit cards, PAYPAL accounts, electronic cash accounts, or other stolen payment accounts or information) with which to pay for mail piece indicia and/or related services.

As compared to a Hacker Case, in a Theft Case, the relevant service provider/vendor would not need to obtain the relevant user's authorization to issue a confiscation instruction to the relevant carrier. Rather, the relevant service provider/vendor would provide the relevant carrier an indication of the reason for issuing a Theft Case confiscation instruction so that the relevant carrier could confirm through, for example, the relevant carrier's investigation, or could confiscate and turn over to the relevant legal authorities.

Alternatively, the relevant service provider/vendor could instruct the relevant carrier to confiscate the relevant mail piece item and return the mail piece item to the relevant service provider/vendor for subsequent turnover to the relevant legal authorities.

Exemplary Confiscation Request Processing.

Figure 10:
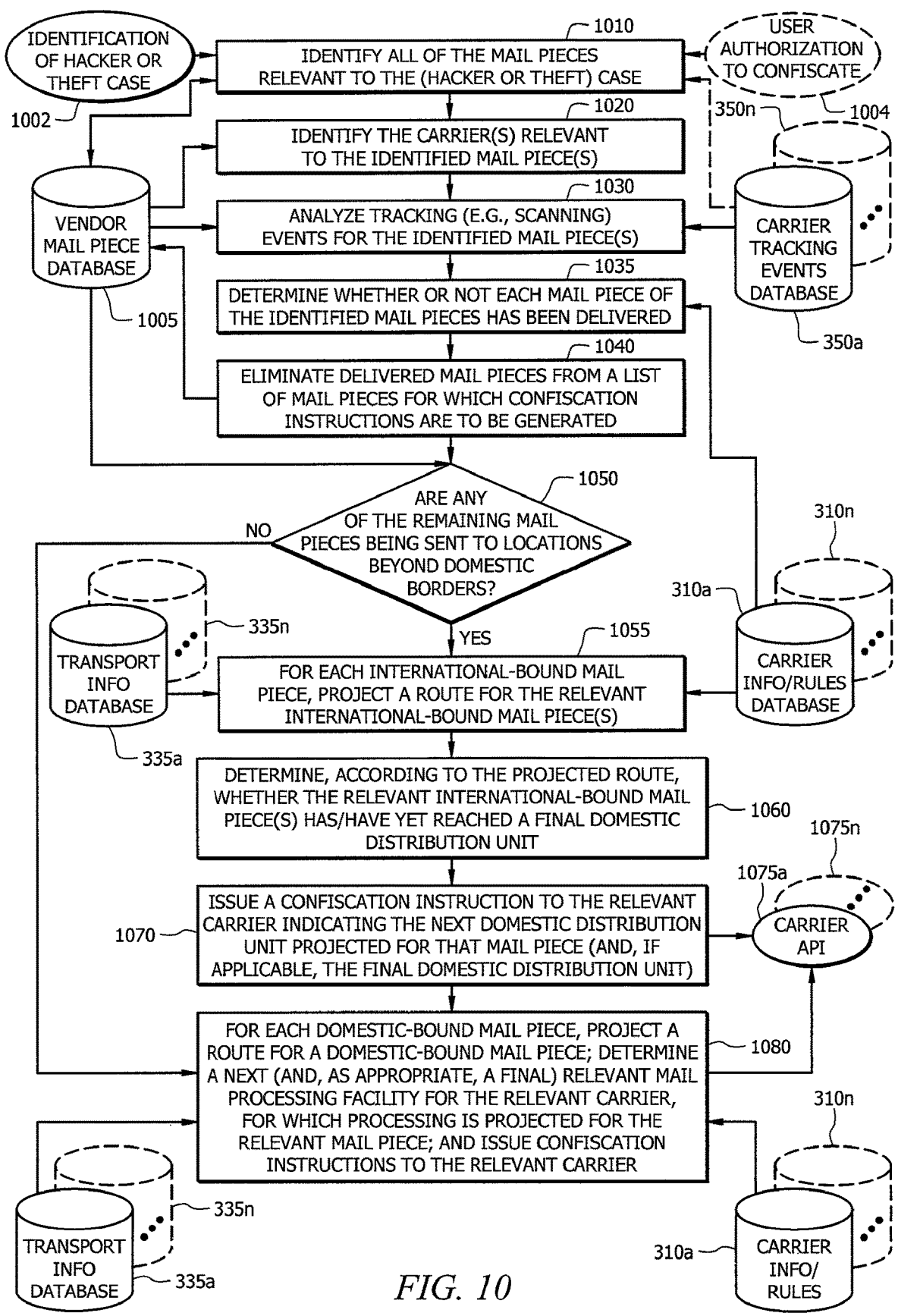
FIG. 10 comprises an illustrative depiction of exemplary high-level logic functions that would be performed in an exemplary embodiment of the present invention to provide Confiscation Instruction generation and processing.

FIG. 10 comprises an illustrative depiction of exemplary high-level logic functions that would be performed in an exemplary embodiment of the present invention to provide Confiscation Instruction generation and processing. As depicted in FIG. 10, once a service provider/vendor becomes aware of a Hacker Case or a Theft Case (1002), and once the service provider/vendor has obtained (to the extent required) authorization to issue confiscation instructions to the relevant carrier (1004), the service provider/vendor would proceed with generation and communicating relevant confiscation instructions to the relevant carrier(s).

In particular, as depicted in FIG. 10, the service provider/vendor would identify 1010 all of the mail pieces relevant to the Hacker Case or the Theft Case, as the case may be. To do that, the exemplary embodiment would analyze the service provider's/vendor's database of mail pieces 1005, that would include mail pieces for which the service provider's/vendor's system had been used to generate mail piece indicia. Further, as optionally depicted in FIG. 10, some exemplary embodiments would also access exemplary Carrier Tracking Events databases 350a-350n to identify mail pieces that had been sent by the relevant user, that may have been sent by the relevant Hacker or Theft Case.

As depicted in FIG. 10, the exemplary embodiment would identify the relevant mail pieces and would indicate, such as in the exemplary service provider's/vendor's mail piece database 1005 (or in any other file or memory storage or database or the like), an indication that the relevant mail piece are associated with the relevant Hacker or Theft Case (e.g., by a Case identifier).

The exemplary embodiment would identify 1020 the carrier(s) relevant to the identified mail piece(s). The exemplary embodiment would analyze 1030 tracking (e.g., scanning) events (e.g., from exemplary Carrier Tracking Events Databases 350a-350n) for the identified mail piece(s) (e.g., as indicated on the exemplary Vendor Mail Piece Database 1005) and would determine 1035 whether or not each mail piece of the identified mail pieces had been delivered (and/or that are otherwise determined by the exemplary embodiment, according to the relevant carrier's rules and information 310a-310n, to have progressed in the relevant carrier's processing stream until it can no longer be intercepted timely, or otherwise to be beyond a stage in delivery processing where confiscation could be executed). Delivered mail pieces (and/or any mail piece that has otherwise been determined by the exemplary embodiment, according to the relevant carrier's rules and information 310a-310n, to have progressed in the relevant carrier's processing stream until it can no longer be intercepted timely, or otherwise to be beyond a stage in delivery processing where confiscation could be executed) would be eliminated 1040 from a list of mail pieces for which confiscation instructions are to be generated.

For mail pieces that remain on the list of mail pieces for which confiscation instructions should be generated, the exemplary embodiment would determine 1050 whether any of the remaining mail pieces are being sent to locations beyond domestic (U.S.) borders (international-bound mail pieces). If so (the exemplary "Y" path from exemplary test function 1050), the exemplary embodiment would project 1055 a route (from a particular origin to a particular destination) for the relevant international-bound mail piece (as described elsewhere herein, including, e.g., accessing exemplary Carrier Information Rules databases 310a-310n, and Transport Information databases 335a-335n) and would determine 1060, according to the projected route, whether (for each such international-bound mail piece) the relevant international-bound mail piece had yet reached a final Domestic Distribution Unit (DDU) within domestic (U.S.) borders, at which a confiscation instruction could still be applied. An exemplary determination of a projected route and an exemplary determination of whether or not a mail piece had yet reached a final Domestic Distribution Unit would involve a determination of a projected schedule and a comparison with current time, in view of already-existing scanning events.

If, according to tracking events, the relevant international-bound mail piece had not yet reached a final Domestic Distribution Unit within domestic (U.S. borders, the exemplary embodiment would issue (generate and communicate) 1070 a Confiscation Instruction that would indicate the next Domestic Distribution Unit projected for that mail piece; and if the next Domestic Distribution Unit were not the final Domestic Distribution Unit, the exemplary embodiment would also indicate in the Confiscation Instruction, the final Domestic Distribution Unit projected for that mail piece. As illustratively depicted in FIG. 10, exemplary embodiments would communicate (1070) Confiscation Instructions to exemplary Carrier API's (Application Programming Interfaces) 1075a-1075n.

In some alternative exemplary embodiments, even if an international-bound mail piece had reached a final Domestic Distribution Unit, the exemplary embodiment would provide confiscation instructions to the relevant carrier, and/or, as well as to the relevant international transport carrier (e.g., airline, ship, etc.), and/or, as well as to the relevant Custom Authorities (and/or other Agencies) for the country/countries to which the item(s) were bound.

In one alternative exemplary embodiment, a service gateway would be provided that: would receive a request to confiscate a particular item; would analyze the item's shipping/mailing status (according to tracking events) with respect to a projected route, and with respect to its ultimate destination; would determine, according to rules by carriers, transport carriers, and foreign governments, agencies and authorities, one or more appropriate entities (carrier(s), transport carrier(s) and/or foreign governments, agencies and/or authorities) to be notified; and would provide a confiscation request/instruction, according to format requirements by the respective appropriate entities (carrier(s), transport carrier(s) and/or foreign governments, agencies and/or authorities).

Similarly, for domestic-bound mail pieces, the exemplary embodiment would project 1080 a route (from a particular origin to a particular destination) for a domestic-bound mail piece (as described elsewhere herein, including, e.g., accessing exemplary Carrier Information Rules databases 310a-310n, and Transport Information databases 335a-335n); would determine (1080; according to tracking events analyzed, e.g., 1030), for example, a next relevant mail processing facility for the relevant carrier, and a final relevant mail processing facility for the relevant carrier, for which processing is projected for the relevant mail piece; and would issue (1080; e.g., would generate and communicate, e.g., through a relevant carrier API 1075a-1075n) Confiscation Instructions for the relevant mail piece(s) to the relevant carrier(s).

An exemplary determination of a projected route and an exemplary determination of whether or not a mail piece had yet reached a final mail processing facility would involve a determination of a projected schedule and a comparison with current time, in view of already-existing scanning events.

Exemplary Confiscation Instructions for domestic-bound mail pieces would comprise an indication of a next relevant mail processing facility for the relevant carrier, and a final relevant mail processing facility for the relevant carrier, for which processing is projected for the relevant mail piece.

In some exemplary embodiments, if a mail piece had already been delivered, or if a mail piece had already passed through a final mail piece processing facility, or through a final Domestic Distribution Unit, some exemplary embodiments would provide a notification to the relevant carrier without a confiscation instruction.

In some exemplary embodiments, the above-described tracking (e.g., scanning) event analysis would be performed for Hacker Cases before attempting to contact a user for authorization (if, in such an exemplary embodiment, user authorization had not been provided with initial registration or at some other time prior to detection of the Hacker Case, and if such user contact is needed to obtain authorization). In this way, the relevant user would only be contacted to authorize confiscation instructions for mail pieces for which it would still be possible to physically intervene with delivery and confiscate the relevant mail piece(s).

Exemplary Confiscation Instructions.

In the exemplary embodiment, Confiscation Instructions would apply to a single mail piece, or alternatively, a Manifest Confiscation Instruction would apply to a plurality of mail pieces being processed by a single carrier. If mail pieces to be confiscated for a particular Hacker Case or a particular Theft Case involved multiple mail pieces sent using various carriers, then the exemplary embodiment would generate, upon request, an exemplary Manifest Confiscation Instruction for each relevant carrier; each exemplary Manifest Confiscation Instruction for each relevant carrier would comprise exemplary Confiscation Instructions for each item to be confiscated by the relevant carrier.

Exemplary Confiscation Instructions would comprise, among other things, an identification of the relevant issuer of the instructions, e.g., the relevant service provider/vendor. Alternatively, as mentioned elsewhere herein, it would be possible, in some exemplary embodiments, for a hacked user to issue a confiscation instruction to the relevant carrier.

Further, exemplary Confiscation Instructions would further comprise, among other things, an identification of the mail piece(s) to be confiscated. Identification of the mail piece(s) to be confiscated would, illustratively, comprise, for example, a mail piece identifier, such as, for example, a tracking identifier, and/or mail piece indicia, and/or destination address, return address, and/or mail piece class, type and/or weight. Yet further, in some exemplary embodiments, exemplary Confiscation Instructions would further comprise, among other things, last-scan event information for the relevant mail piece (such as, e.g., a date/time-stamp of the last scan by the relevant carrier for the relevant mail piece). Further still, in some exemplary embodiments, exemplary Confiscation Instructions would further comprise, among other things, a projected next mail piece processing facility by the relevant carrier, and if appropriate, a final mail piece processing facility by the relevant carrier. As described elsewhere herein, a projected next and/or final mail piece processing facility may comprise a next and/or final Domestic Distribution Unit for an international-bound mail piece.

Further, exemplary Confiscation Instructions would further comprise, among other things, exemplary respective mail piece disposition instructions for the relevant respective mail piece(s). In the exemplary embodiment, an exemplary Manifest Confiscation Instruction could comprise an exemplary Confiscation Instruction for each mail piece to be confiscated by the relevant carrier; each Confiscation Instruction in the exemplary Manifest Confiscation Instruction could comprise a mail-piece-specific disposition instruction; or alternatively, a single disposition instruction could be provided for the Manifest Confiscation Instruction, to be applied to all mail pieces identified by the Manifest Confiscation Instruction.

Exemplary mail piece disposition instructions in an exemplary Confiscation Instruction may comprise one or more of the following exemplary types of instructions: an instruction for the relevant carrier to investigate; an instruction for the relevant carrier to turn the relevant mail piece over to a relevant legal authority; an instruction for the relevant carrier to return the relevant mail piece to the service provider/vendor (with a relevant return address); an instruction (under limited circumstances) to destroy the relevant mail piece; and the like.

Facsimile Reproduction of Copyright Material

A portion of the disclosure of this patent document contains material which is subject to copyright protection by the copyright owner, Stamps.com Inc., and its successors and assigns. The copyright owner has no objection to the facsimile reproduction by anyone of the patent document or the patent disclosure, as it appears in the Patent and Trademark Office patent file or records, but otherwise reserves all copyright rights whatsoever.

ILLUSTRATIVE EMBODIMENTS

Although this invention has been described in certain specific embodiments, many additional modifications and variations would be apparent to those skilled in the art. It is, therefore, to be understood that this invention may be practiced otherwise than as specifically described. Moreover, to those skilled in the various arts, the invention itself herein will suggest solutions to other tasks and adaptations for other applications. Thus, the embodiments of the invention described herein should be considered in all respects as illustrative and not restrictive, the scope of the invention to be determined by the appended claims and their equivalents rather than the foregoing description.

What is claimed:

1. A method for providing mail piece interception/rescue services, the method being implemented by a vendor computer system associated with a vendor, the vendor computer system being different from a carrier computer system associated with a carrier and comprising one or more processors executing computer program instructions that, when executed, perform the method, the method comprising:

monitoring the carrier's tracking events for a mail piece;
determining, based on the monitoring, one or more variances of the carrier's tracking events for the mail piece from a projected route or delivery schedule for the mail piece;
generating, based on the one or more variances and the projected route or delivery schedule, a variance report message and providing the variance report message for presentation to a user, the variance report message comprising (i) indications of variances from the projected route or delivery schedule and (ii) identifying information for the mail piece; and
responsive to a user interaction with the variance report message via a user device of the user, causing user interface input fields in the user device's application to become automatically pre-populated with the identifying information from the variance report message, the user interface input fields in the user device's application being automatically pre-populated for an interception or rescue request to be submitted from the user device's application.

2. The method of claim 1, further comprising:
responsive to a submission of the interception or rescue request from the user device's application, using an application program interface of the carrier to file the interception or rescue request with the carrier computer system.

3. The method of claim 2, further comprising:
responsive to a user-activation of a hyperlink associated with another mail piece via an other user device, causing user interface input fields in the other user device's application to become automatically pre-populated with identifying information for the other mail piece, the user interface input fields in the other user device's application being automatically pre-populated for another interception or rescue request to be submitted from the other user device's application; and
responsive to a submission of the other interception or rescue request from the other user device's application, using another carrier's application program interface to file the other interception or rescue request with another carrier computer system associated with the other carrier.

4. The method of claim 1, further comprising:
determining a second projected route or delivery schedule for a second mail piece;
monitoring a second carrier's tracking events for the second mail piece;
determining a predetermined time period for the second mail piece; and
initiating, based on a lack of a tracking event occurring by an expiration of the predetermined time period, a second interception or rescue request for the second mail piece, the second interception or rescue request being filed with a second carrier computer system associated with the second carrier.

5. The method of claim 4, wherein determining the predetermined time period comprises determining the predetermined time period for the second mail piece based on a delivery service of the second carrier used to send the second mail piece.

6. The method of claim 1, further comprising: determining the projected route or delivery schedule for the mail piece based on a delivery service.

7. The method of claim 1, further comprising:
determining the projected route or delivery schedule for the mail piece based on hubs and processing facilities of the carrier.

8. The method of claim 1, further comprising:
determining the projected route or delivery schedule for the mail piece based on (i) rules of the carrier, (ii) weight or size of the mail piece, (iii) origin from which the mail piece is shipped, and (iv) shipping date of the mail piece.

9. The method of claim 1, wherein the vendor is a postage indicia provider.

10. The method of claim 1, wherein the one or more variances comprise a lack of a tracking event occurring by an expiration of a predetermined time period for the mail piece.

11. The method of claim 1, wherein the one or more variances comprise a tracking event indicating the mail piece being located at a location not specified in the projected route or delivery schedule.

12. The method of claim 1, wherein the one or more variances comprise (i) an indication of a delay in shipping or delivering the mail piece not specified in the projected route or delivery schedule or (ii) an indication of weather conditions predicted to affect an actual route or delivery schedule for the mail piece.

13. The method of claim 1, wherein the one or more variances comprise an indication of transport conditions predicted to affect an actual route or delivery schedule for the mail piece.

14. A system comprising:
a vendor computer system associated with a vendor, the vendor computer system being external to a carrier computer system associated with a carrier and comprising one or more processors programmed with computer program instructions that, when executed, cause the vendor computer system to:
monitor the carrier's tracking events for a mail piece;
determine, based on the monitoring, one or more variances of the carrier's tracking events for the mail piece from a projected route or delivery schedule for the mail piece;
generate, based on the one or more variances and the projected route or delivery schedule, a variance report message and providing the variance report message for presentation to a user, the variance report message comprising (i) indications of variances from the projected route or delivery schedule and (ii) identifying information for the mail piece; and
responsive to a user interaction with the variance report message via a user device of the user, cause user interface input fields in the user device's application to become automatically pre-populated with the identifying information from the variance report message, the user interface input fields in the user device's application being automatically pre-populated for an interception or rescue request to be submitted from the user device's application.

15. The system of claim 14, wherein the vendor computer system is caused to:
responsive to a submission of the interception or rescue request from the user device's application, use an application program interface of the carrier to file the interception or rescue request with the carrier computer system.

16. The system of claim 15, wherein the vendor computer system is caused to:
responsive to a user-activation of a hyperlink associated with another mail piece via an other user device, cause user interface input fields in the other user device's application to become automatically pre-populated with identifying information for the other mail piece, the user interface input fields in the other user device's application being automatically pre-populated for another interception or rescue request to be submitted from the other user device's application; and
responsive to a submission of the other interception or rescue request from the other user device's application, use another carrier's application program interface to file the other interception or rescue request with another carrier computer system associated with the other carrier.

17. The system of claim 14, wherein the vendor computer system is caused to:
determine a second projected route or delivery schedule for a second mail piece;
monitor a second carrier's tracking events for the second mail piece;
determine a predetermined time period for the second mail piece; and
initiate, based on a lack of a tracking event occurring by an expiration of the predetermined time period, a second interception or rescue request for the second mail piece, the second interception or rescue request being filed with a second carrier computer system associated with the second carrier.

18. The system of claim 14, wherein the vendor is a postage indicia provider.

19. One or more non-transitory computer-readable storage media comprising computer instructions that, when executed by one or more processors of a vendor computer system associated with a vendor, cause the vendor computer system to perform the following operations:
monitoring a carrier's tracking events for a mail piece, the carrier being associated with a carrier computer system different from the vendor computer system;
determining, based on the monitoring, one or more variances of the carrier's tracking events for the mail piece from a projected route or delivery schedule for the mail piece;
generating, based on the one or more variances and the projected route or delivery schedule, a variance report message and providing the variance report message for presentation to a user, the variance report message comprising (i) indications of variances from the projected route or delivery schedule and (ii) identifying information for the mail piece; and
responsive to a user interaction with the variance report message via a user device of the user, causing user interface input fields in the user device's application to become automatically pre-populated with the identifying information from the variance report message, the user interface input fields in the user device's application being automatically pre-populated for an interception or rescue request to be submitted from the user device's application.

20. The one or more non-transitory computer-readable storage media of claim 19, the operations further comprising:
responsive to a submission of the interception or rescue request from the user device's application, using an application program interface of the carrier to file the interception or rescue request with the carrier computer system.

* * * * *